(12) United States Patent
Igarashi et al.

(10) Patent No.: US 7,550,711 B2
(45) Date of Patent: Jun. 23, 2009

(54) ENCODER FOR A PRINTER MOTOR AND A PRINTER USING THE SAME

(75) Inventors: Hitoshi Igarashi, Nagano (JP); Satoshi Nakata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/503,133

(22) Filed: Aug. 14, 2006

(65) Prior Publication Data

US 2007/0034788 A1 Feb. 15, 2007

(30) Foreign Application Priority Data

Aug. 12, 2005 (JP) ............................ P2005-234050

(51) Int. Cl.
*G01D 5/34* (2006.01)
(52) U.S. Cl. .................... 250/231.16; 250/229
(58) Field of Classification Search ...............
250/231.13–231.18, 237 G; 356/616–617;
33/1 PT, 1 N, 1 L; 341/11, 13
See application file for complete search history.

(56) References Cited

U.S. PATENT DOCUMENTS 4,092,533 A * 5/1978 Ohsako et al. ......... 250/231.16
4,203,679 A * 5/1980 Duerr et al. .................. 400/320
5,657,125 A * 8/1997 Kato et al. ................... 356/499
6,992,278 B2 * 1/2006 Sjoberg et al. ......... 250/231.17

FOREIGN PATENT DOCUMENTS

JP  2001-232882 A  8/2001
JP  2003-166856 A  6/2003

* cited by examiner

*Primary Examiner*—Georgia Y Epps
*Assistant Examiner*—Tony Ko
(74) *Attorney, Agent, or Firm*—Sughrue Mion, PLLC

(57) ABSTRACT

A light emitter is operable to emit light. A scale comprises a transparent main body and a plurality of marks. The transparent main body has a first face and the second face which is opposite to the first face. The plurality of marks is provided on at least one of the first face and the second face and formed at a predetermined interval, and adapted to reflect or intercept the light emitted from the light emitter. A light detector is operable to detect light reflected by the marks or light passing through a plurality of regions each of which is defined between adjacent ones of the marks. The main body of the scale is formed with a plurality of through holes each of which connects the first face and the second face at one of the regions.

5 Claims, 15 Drawing Sheets

ENCODER FOR A PRINTER MOTOR AND A PRINTER USING THE SAME

BACKGROUND OF THE INVENTION

The present invention relates to an encoder and a printer using the same.

Printers have various motors such as a paper feed motor for driving a feed roller that conveys print paper or a print object and a carriage motor for driving a carriage having a print head. DC motors are widely used as such motors to reduce noise. Printers having DC motors are equipped with an encoder composed of a scale having marks or slits disposed at specified intervals and a sensor that senses the marks or slits of the scale to output given signals to control the positions and speeds of the DC motors.

For example, to control a paper feed motor, printers have a disc-shaped scale having multiple slits arranged at specified intervals and a sensor constructed to sandwich each slit between a light-emitting device and a light-receiving device. This type of scale is constructed to rotate with a feed roller. This type of sensor generally outputs two signals with a phase difference of 90° (for example, refer to Japanese Patent Publication No. 2001-232882). The motor is controlled by sensing changing points of the levels of the two signals output from the sensor.

Among the optical encoders, an optical encoder that has graduations attached to a transparent glass substrate, and allows light reflected by the graduations to pass through a space between the graduations is known (see Japanese Patent Publication No. 2001-232882).

In order to improve print quality, more accurate control is required for motors mounted to printers. For more accurate control, encoders have to output signals with higher resolution. There may be two methods for outputting higher-resolution signals from encoders: a method of increasing the diameter of the disc-shaped scale while maintaining the intervals of the slits and a method of decreasing the interval of the slits while maintaining the diameter of the scale.

However, printers that need to be compact cannot have a large-diameter scale. To provide the space for the scale, the mechanical structure of the printers becomes complicated. In contrast, narrowing the interval between slits makes it difficult to manufacture the scale itself.

Since an ink mist occurs in an apparatus using ink, such as a printer, if the interval between the graduations is narrow, a portion, through which light passes, may significantly change due to the ink mist, and thus control may be made unstable.

SUMMARY OF THE INVENTION

Accordingly, it is an object of the invention to provide an encoder that, even though wastes, such as an ink mist and so on, are attached to a scale, can prevent output signals from being made unstable. It is another object of the invention to provide a printer that can perform stable control with high accuracy.

In order to achieve the above objects, according to the embodiment of the invention, there is provided an encoder comprising:

a light emitter, operable to emit light;

a scale comprising:

a transparent main body which has a first face and the second face which is opposite to the first face; and a plurality of marks provided on at least one of the first face and the second face and formed at a predetermined interval, and adapted to reflect or intercept the light emitted from the light emitter; and a light detector operable to detect light reflected by the marks or light passing through a plurality of regions each of which is defined between adjacent ones of the marks, wherein the main body of the scale is formed with a plurality of through holes each of which connects the first face and the second face at one of the regions.

The number of the through hole may be no more than one third of a total number of the regions.

The number of the through hole may be no less than one tenth of a total number of the regions.

The marks may be arranged on the first face in a first direction; and a width in the first direction of the through hole may be wider than the interval between the marks.

The marks may be arranged on the first face in a first direction; and a width in the first direction of the through hole may be narrower than the interval between the marks.

According to the invention, there is also provided a printer operable to print information on a printing medium comprising:

a motor having a rotatable shaft;

the encoder described above, wherein the scale is rotated in conjunction with the rotation of the shaft, and the light detector is operable to output a signal in accordance with the rotation of the scale;

a controller, which controls the rotation of the shaft based on the signal output from the detector.

The motor may be operable to rotate a roller adapted to feed the printing medium.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an encoder and a printer using the same according to an embodiment of the invention will be described in detail with reference to the accompanying drawings. Moreover, the configuration of the printer will first be described, and the configuration of the encoder will be described, together with the description of the printer. In addition, as regards the description of the printer, a control method of a printer will also be described.

First Embodiment (Schematic Structure of Printer)

Figure 1:
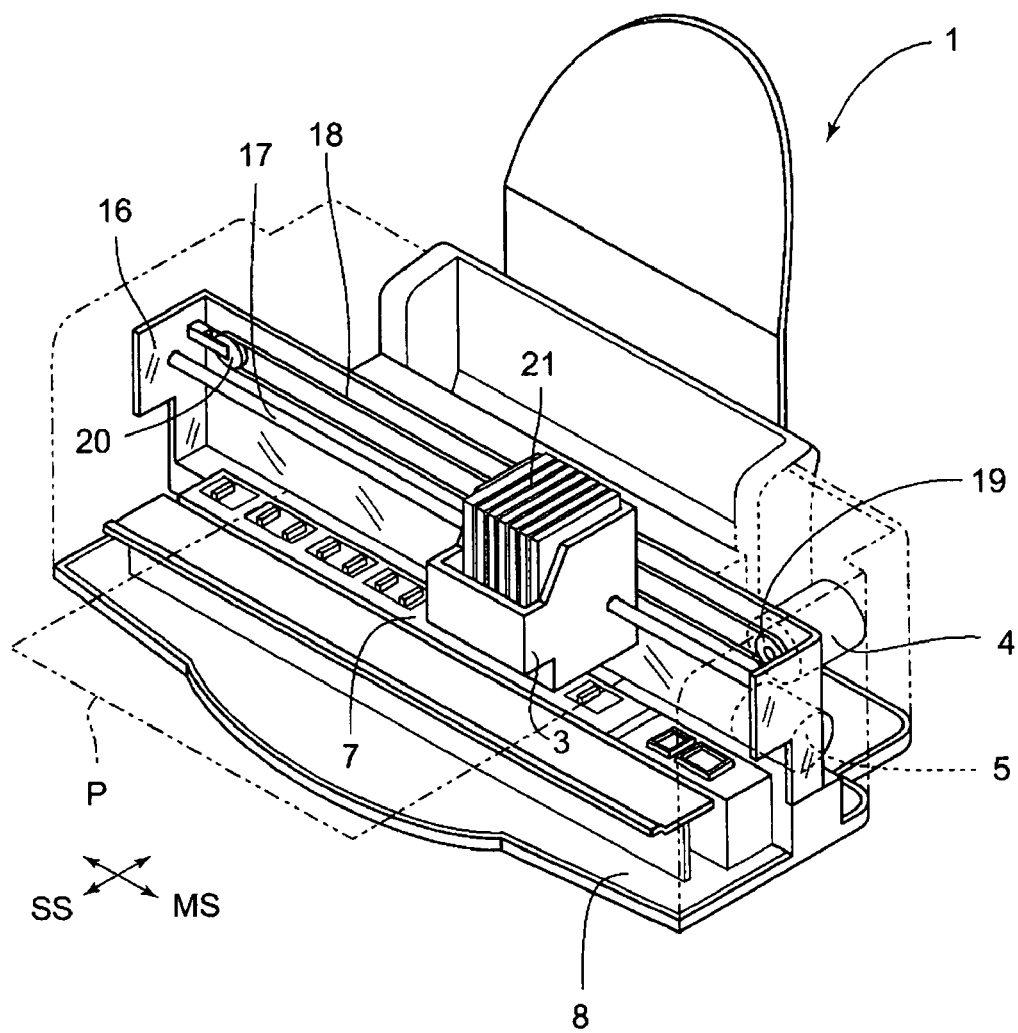
FIG. 1 is a schematic perspective view of a printer according to a first embodiment of the invention.
Figure 2:
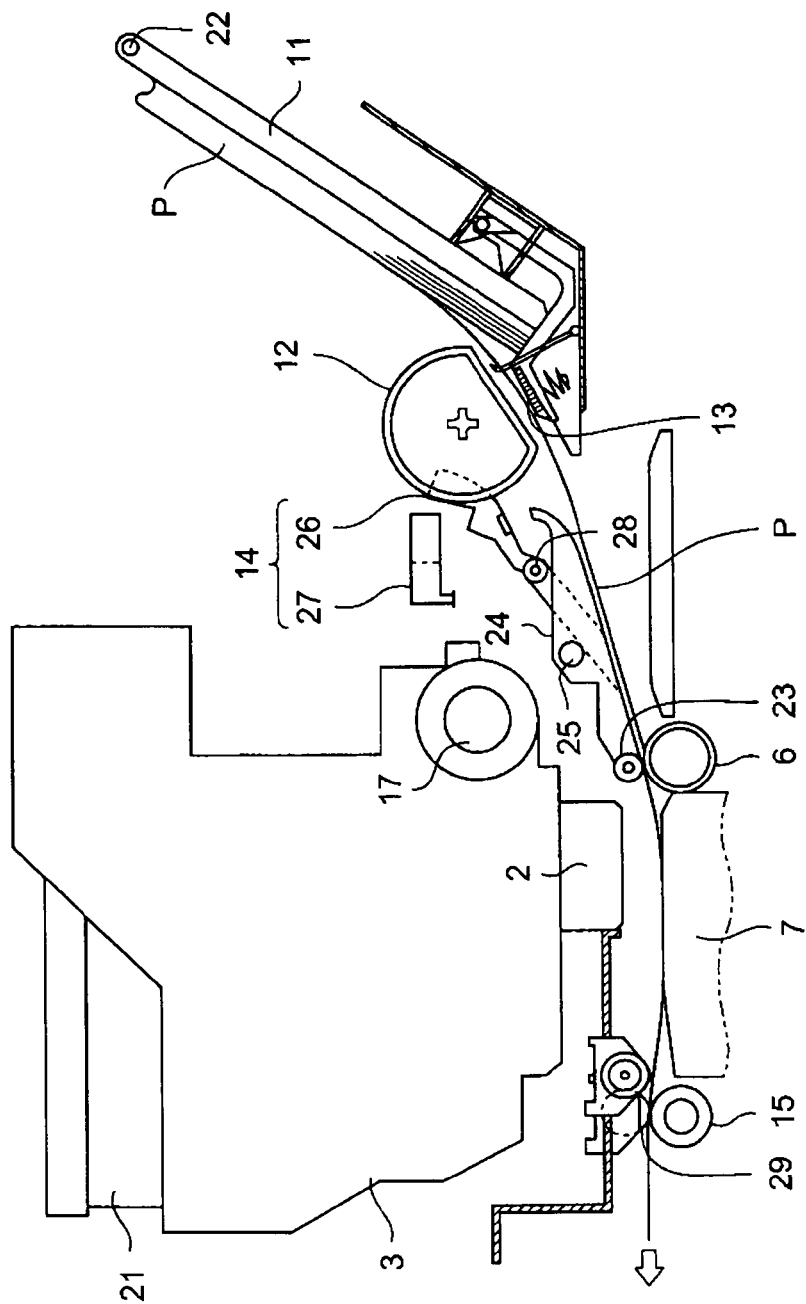
FIG. 2 is a schematic side view of a part for paper feeding of the printer of FIG. 1.
Figure 3:
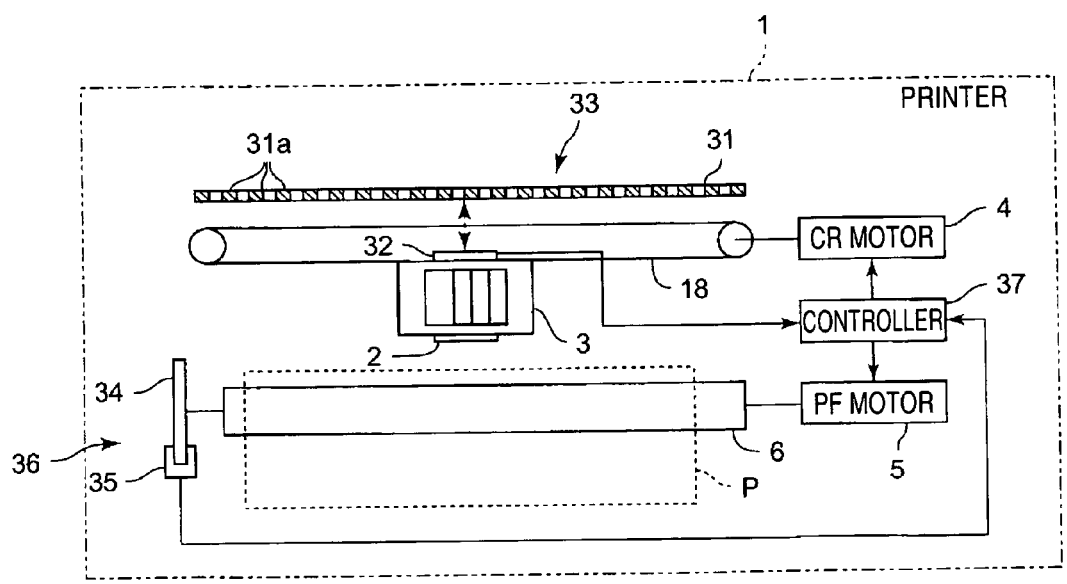
FIG. 3 is a schematic diagram of a carriage of FIG. 1 and a sensor mechanism of a PF drive roller of FIG. 2.

FIG. 1 is a schematic perspective view of a printer 1 according to a first embodiment of the invention; FIG. 2 is a schematic side view of a part for paper feeding of the printer 1 of FIG. 1; FIG. 3 is a schematic diagram of a carriage 3 of FIG. 1 and a sensor mechanism of a PF drive roller 6 of FIG. 2.

The printer 1 of the first embodiment is an inkjet printer that ejects ink to print paper P or a print object to thereby execute printing. Referring to FIGS. 1 to 3, the printer 1 includes a carriage 3 having a print head 2 that ejects ink droplets; a carriage motor (CR motor) 4 that drives the carriage 3 in a main scanning direction MS; a paper feed motor (PF motor) 5 that feeds the print paper P in a subscanning direction SS; a PF drive roller 6 connected to the PF motor 5; a platen 7 opposed to the nozzle surface (the lower surface in FIG. 2) of the print head 2; and a chassis 8 on which these components are mounted. In this embodiment, the CR motor 4 and the PF motor 5 are both a direct-current (DC) motor.

As shown in FIG. 2, the printer 1 further includes a hopper 11 on which the print paper P before printing is placed; a paper feed roller 12 and a separation pad 13 for taking the print paper P placed on the hopper 11 into the printer 1; a paper sensor 14 that senses the passage of the print paper P taken into the printer 1 from the hopper 11; and a delivery drive roller 15 that ejects the print paper P from the printer 1.

The carriage 3 can be moved in the main scanning direction MS by a guide shaft 17 supported by a support frame 16 fixed to the chassis 8 and a timing belt 18. Specifically, the timing belt 18 runs between a pulley 19 and a pulley 20 under a specified tension, the pulley 19 being partly secured to the carriage 3 and being fixed to the output shaft of the CR motor 4, and the pulley 20 being rotatably fixed to the support frame 16. The guide shaft 17 sidably holds the carriage 3 so as to guide the carriage 3 in the main scanning direction MS. The carriage 3 further has an ink cartridge 21 in addition to the print head 2, in which various inks to be supplied to the print head 2 are housed.

The paper feed roller 12 connects to the PF motor 5 with a gear (not shown), and is driven by the PF motor 5. As shown in FIG. 2, the hopper 11 is a plate-like member on which the print paper P can be placed, which can be oscillated about a rotation shaft 22 at the top by a cam mechanism (not shown). The oscillation by the cam mechanism springily brings the lower end of the hopper 11 into and out of pressure contact with the paper feed roller 12. The separation pad 13 is made of a high-friction member and is opposed to the paper feed roller 12. As the paper feed roller 12 rotates, the surface of the paper feed roller 12 and the separation pad 13 come into pressure contact with each other. Accordingly, when the paper feed roller 12 rotates, the uppermost of the print paper P placed on the hopper 11 passes through the contact between the surface of the paper feed roller 12 and the separation pad 13 toward the delivery side; the second and later upper print paper P are stopped by the separation pad 13.

The PF drive roller 6 connects to the PF motor 5 directly or with a gear (not shown). As shown in FIG. 2, the printer 1 further has a PF driven roller 23 that feeds the print paper P with the PF drive roller 6. The PF driven roller 23 is rotatably held at the delivery side of a driven-roller holder 24 that is rotatable about a rotation shaft 25. The driven-roller holder 24 is urged counterclockwise (in the drawing) by a spring (not shown) so that the PF driven roller 23 is constantly urged to the PF drive roller 6. When the PF drive roller 6 is driven, the PF driven roller 23 also rotates with the PF drive roller 6.

As shown in FIG. 2, the paper sensor 14 is composed of a sensing lever 26 and a sensor 27, and is disposed in the vicinity of the driven-roller holder 24. The sensing lever 26 is rotatable about a rotation shaft 28. When the print paper P completes passing below the sensing lever 26 from the passing state shown in FIG. 2, the sensing lever 26 turns counterclockwise. When the sensing lever 26 turns, the light from a light-emitting portion of the sensor 27 toward a light-receiving portion is interrupted to thereby sense the passage of the print paper P.

The delivery drive roller 15 is disposed on the delivery side of the printer 1, and connects to the PF motor 5 with a gear (not shown). As shown in FIG. 2, the printer 1 further includes a delivery driven roller 29 for delivering the print paper P together with the delivery drive roller 15. Like the PF driven roller 23, the delivery driven roller 29 is also constantly urged toward the delivery drive roller 15 by a spring (not shown). When the delivery drive roller 15 is driven, the delivery driven roller 29 also rotates with the delivery drive roller 15.

Referring to FIG. 3, the printer 1 further includes a linear encoder 33 having a linear scale 31 and a sensor 32 for determining the rotational position of the CR motor 4 (the position of the carriage 3 in the main scanning direction MS) and the rotational speed of the CR motor 4 (the speed of the carriage 3); and a rotary encoder 36 having a rotary scale 34 and a sensor 35 for determining the rotational position of the PF motor 5 in the subscanning direction SS (the position of the print paper P in the subscanning direction SS) and the rotational speed of the PF motor 5 (the feeding speed of the print paper P).

The linear scale 31 is shaped in a long straight line, and is mounted to the support frame 16 in parallel with the main scanning direction MS. The linear scale 31 has marks 31a at specified intervals. The sensor 32 has a light-emitting device and a light-receiving device (not shown), and is mounted to the carriage 3. The linear encoder 33 outputs a specified output signal in such a manner that the light emitted from the light-emitting device toward the linear scale 31 is reflected by the marks 31a, and the light-receiving device receives the reflected light. Unlike a rotary scale 34 to be described below, the linear scale 31 does not have a main body portion formed of a transparent member. However, the linear scale 31 may have a main body portion formed of a transparent member.

The rotary scale 34 is shaped like a disc, and is mounted to the PF drive roller 6 so as to rotate therewith. Specifically, when the PF drive roller 6 makes a turn, the rotary scale 34 also makes a turn. The sensor 35 is fixed to the chassis 8 with a bracket (not shown). Alternatively, the rotary scale 34 may be connected to the PF drive roller 6 with a gear or the like. However, mounting the rotary scale 34 directly to the PF drive roller 6 so as to rotate therewith allows one-to-one correspondence of the rotation amount of the rotary scale 34 and that of the PF drive roller 6 without errors such as play at the engaging portion of a gear. The details of the structure of the rotary encoder 36 will be described later.

(Schematic Structure of Controller of Printer)

Figure 4:
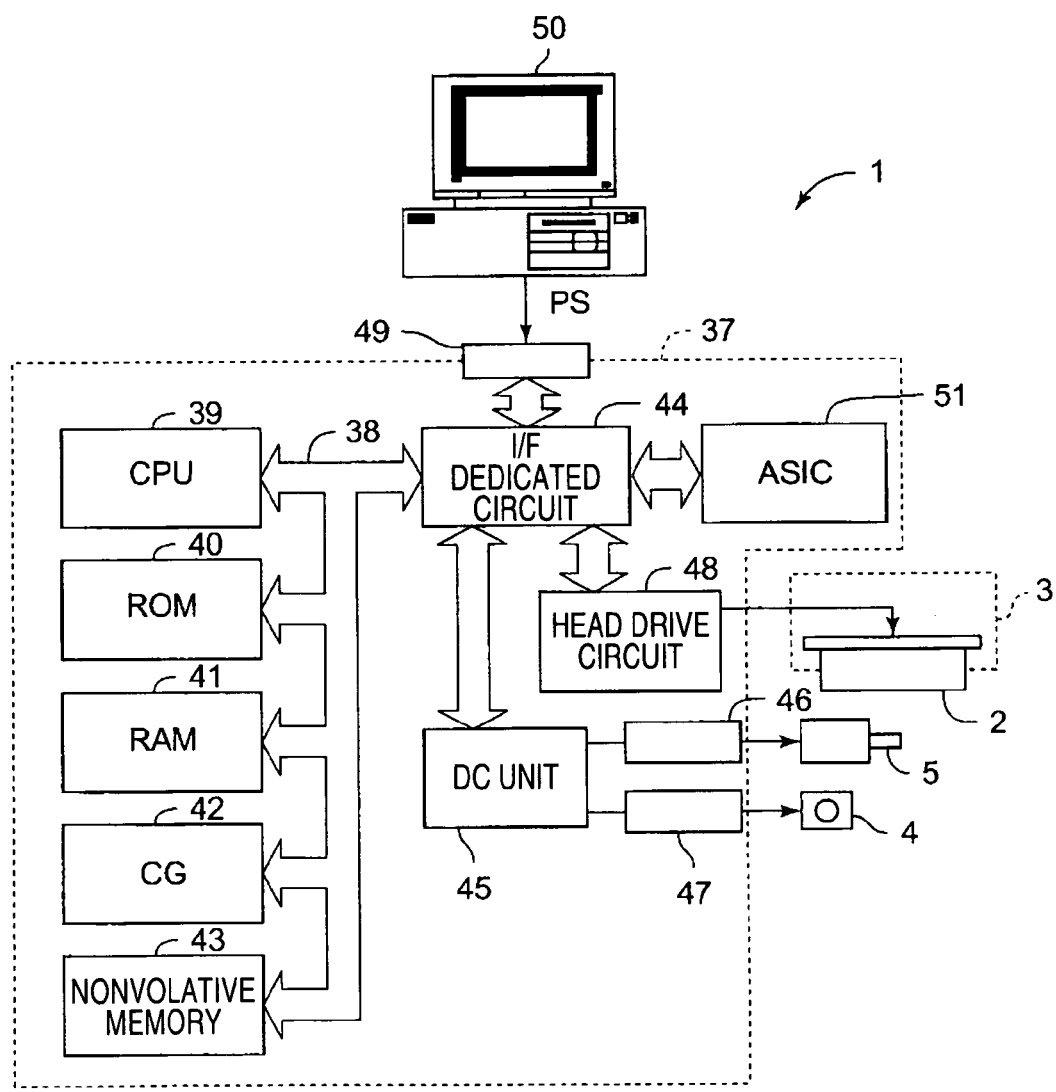
FIG. 4 is a block diagram showing the schematic structure of a controller of the printer and its peripherals.

FIG. 4 is a block diagram showing the schematic structure of a controller 37 of the printer 1 and its peripherals.

As shown in FIG. 4, the controller 37 includes a bus 38, a CPU 39, a ROM 40, a RAM 41, a character generator (CG) 42, a nonvolatile memory 43, an interface (I/F) dedicated circuit 44, a DC unit 45, a PF-motor drive circuit 46, a CR-motor drive circuit 47, a head drive circuit 48, and an application-specific integrated circuit (ASIC) 51. The controller 37 is configured such that the CPU 39 and the ASIC 51 receive output signals from the linear encoder 33 and the rotary encoder 36.

The CPU 39 performs operations for executing the control programs of the printer 1 stored in the ROM 40 and the nonvolatile memory 43 and other necessary operations. The ROM 40 stores control programs for controlling the printer 1 and data necessary for processing. For example, the ROM 40 stores a target speed table that contains target rotational speeds for the rotational positions of the CR motor 4 and the PF motor 5.

The RAM 41 temporarily stores programs that the CPU 39 is executing and data during operation. The CG 42 stores dot patterns expanded corresponding to print signals input to the I/F dedicated circuit 44. The nonvolatile memory 43 stores various data that needs to be stored after the printer 1 is turned off. The I/F dedicated circuit 44 has a parallel interface circuit, which can receive print signals sent from a computer 50 via a connector 49. The ASIC 51 controls the CR motor 4 and the PF motor 5 via the DC unit 45, and controls the print head 2 via the head drive circuit 48.

The DC unit 45 is a control circuit for controlling the speed of the DC motor. The DC unit 45 performs various operations for controlling the speed of the CR motor 4 and the PF motor 5 according to the control instruction sent from the CPU 39 and signals output from the ASIC 51 via the I/F dedicated circuit 44, and outputs motor control signals to the PF-motor drive circuit 46 and the CR-motor drive circuit 47 on the basis of the calculations.

The PF-motor drive circuit 46 controls the driving of the PF motor 5 according to the motor control signal from the DC unit 45. This embodiment adopts a pulse width modulation (PWM) control to control the PF motor 5. Thus the PF-motor drive circuit 46 outputs a PWM driving signal. Similarly, the CR-motor drive circuit 47 controls the CR motor 4 in response to the motor control signal from the DC unit 45.

The head drive circuit 48 drives the nozzles of the print head 2 under the control instruction sent from the CPU 39 or the ASIC 51 via the I/F dedicated circuit 44.

The bus 38 is a signal line that connects the foregoing components of the controller 37. The bus 38 interconnects the CPU 39, the ROM 40, the RAM 41, the CG 42, the nonvolatile memory 43, and the I/F dedicated circuit 44 to enable exchange of data.

(Structure of PF-Motor Speed Control Unit)

Figure 5:
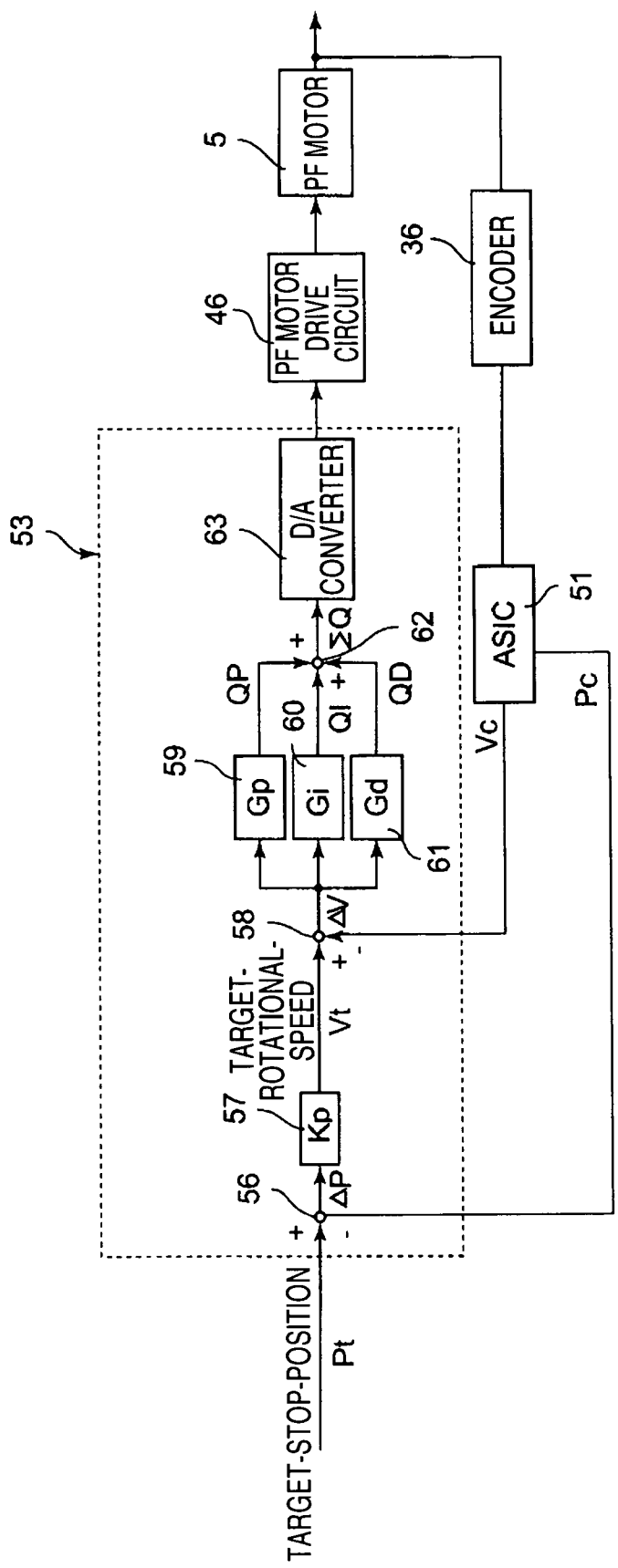
FIG. 5 is a block diagram showing the structure of a speed control unit for a PF motor in a DC unit of FIG. 4.
Figure 6:
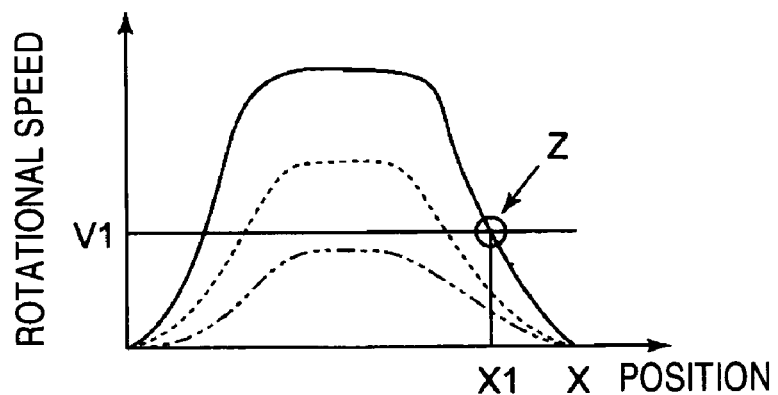
FIG. 6 is a graph of an example of target speed curves drawn from a target speed table.
Figure 7:
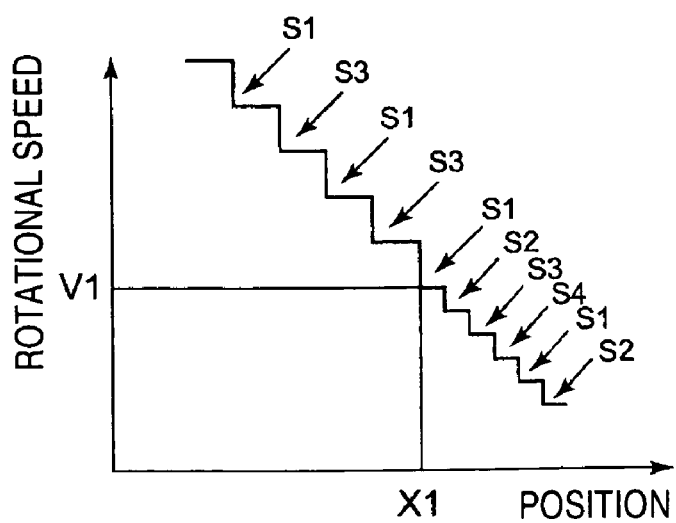
FIG. 7 is an enlarged view of part Z in FIG. 6.

FIG. 5 is a block diagram showing the structure of a speed control unit 53 for the PF motor 5 in the DC unit 45; FIG. 6 is a graph of examples of a target speed curve drawn from the target speed table stored in the ROM 40 of FIG. 4; and FIG. 7 is an enlarged view of part Z in FIG. 6.

As has been described, the DC unit 45 serves as a control circuit for controlling the speed of the CR motor 4 and the PF motor 5. The structure of the speed control unit 53 for the PF motor 5 in the DC unit 45 will be described hereinbelow. A speed control unit for the CR motor 4 in the DC unit 45 has the same structure as the speed control unit 53.

As shown in FIG. 5, the speed control unit 53 includes a location-deviation operating section 56, a target-speed operating section 57, a speed-deviation operating section 58, a comparing element 59, an integrator element 60, a differentiating element 61, an adding section 62, and a D/A converter 63. In other words, this embodiment employs a proportional, integral, and derivative (PID) control to control the PF motor 5, in which the present rotational speed of the PF motor 5 is converged to a target rotational speed by a combination of comparing control, integral control, and derivative control. The location-deviation operating section 56 and the speed-deviation operating section 58 receive specified signals from the ASIC 51.

As has been described, the ASIC 51 receives a signal output from the rotary encoder 36. The ASIC 51 outputs a present-rotational-position signal (a print-paper-P present-position signal) Pc corresponding to the present rotational position of the PF motor 5 responding to an output signal from the rotary encoder 36, and a present-rotational-speed signal (a print-paper-P present-feed-speed signal) Vc corresponding to the present rotational speed of the PF motor 5 responding to an output signal from the rotary encoder 36.

The location-deviation operating section 56 receives the present-rotational-position signal Pc and a target-stop-position signal Pt corresponding to the next stop position of the print paper P in the subscanning direction SS. The location-deviation operating section 56 calculates and outputs a location-deviation signal dP corresponding to location deviation that is the difference between the input present-position signal Pc and the target-stop-position signal Pt. The target-stop-position signal Pt is input from the CPU 39.

The target-speed operating section 57 receives the location-deviation signal dP. The target-speed operating section 57 calculates and outputs a target-rotational-speed signal (a print-paper-P target-feed-speed signal) Vt corresponding to the target rotational speed of the PF motor 5 on the basis of the input location-deviation signal dP. More specifically, the target-speed operating section 57 reads a target-rotational-speed signal Vt corresponding to the location-deviation signal dP from the target speed table stored in the ROM 40 and outputs it.

The solid line of FIG. 6 shows an example of a target speed curve created from the target speed table store in the ROM 40. The target speed curve created from the target speed table has an accelerating region, a constant-speed region, and a decelerating region toward a target stop position X. The target speed table provides the target-rotational-speed signal Vt so as to correspond to the location-deviation signal dP in a specified range of values. Accordingly, the target speed curve is actually in the form of steps, as shown in FIG. 7, so that the target rotational speed is held constant even if the location-deviation signal dP varies slightly. Rotational speed in the constant-speed region depends on print mode. For example, the ROM 40 also stores target-speed tables corresponding to the dotted line and the two-dot chain line in FIG. 6. The ROM 40 also stores a target-speed table corresponding to various target stop positions.

The speed-deviation operating section 58 receives the target-rotational-speed signal Vt and the present-rotationalspeed signal Vc. The speed-deviation operating section 58 outputs a speed deviation signal dV that is the difference between the input target-rotational-speed signal Vt and the present-rotational-speed signal Vc. The speed deviation signal dV output from the speed-deviation operating section 58 is input to the comparing element 59, the integrator element 60, and the differentiating element 61. The comparing element 59, the integrator element 60, and the differentiating element 61 respectively output a comparing-control-value signal QP, an integral-control-value signal QI, and a derivative-control-value signal QD calculated from the input speed deviation signal dV by a specified calculating expression.

The adding section 62 receives the comparing-control-value signal QP output from the comparing element 59, the integral-control-value signal QI output from the integrator element 60, and the derivative-control-value signal QD output from the differentiating element 61. The adding section 62 adds the control value signals QP, QI, and QD to output a PID-control-value signal □Q that is digital data, to the D/A converter 63. The D/A converter 63 converts the digital PID-control-value signal □Q to analog data, and outputs it. The analog data output from the D/A converter 63 is input to the PF-motor drive circuit 46 as a motor control signal.

(Structure of Rotary Encoder)

Figure 8:
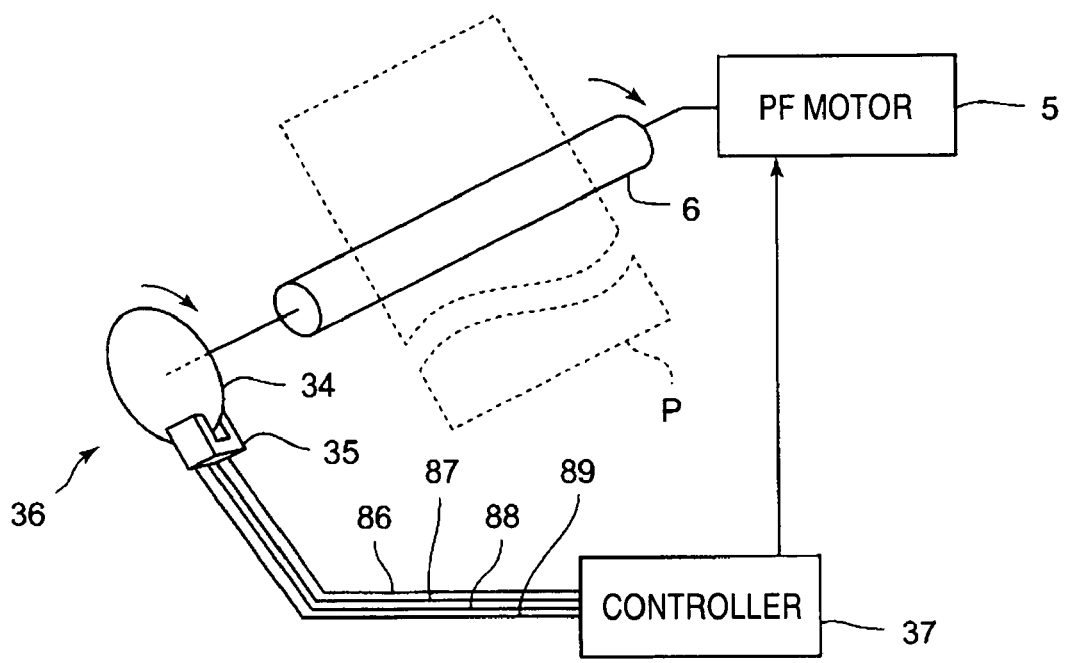
FIG. 8 is a schematic diagram of a part related to the rotary encoder in FIG. 3.
Figure 9:
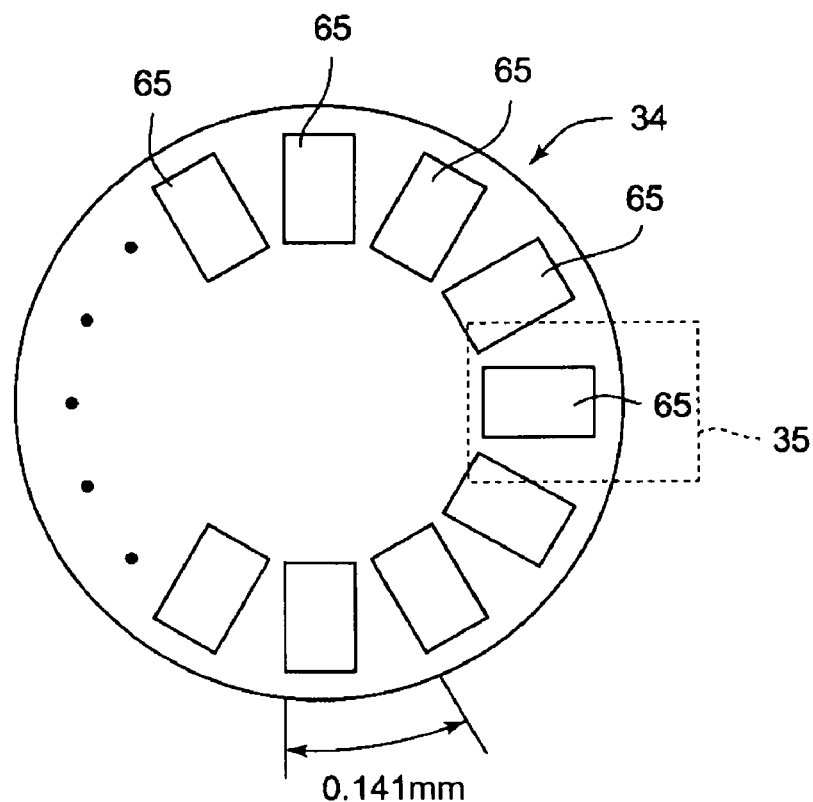
FIG. 9 is a front view of the rotary scale in FIG. 3.
Figure 10:
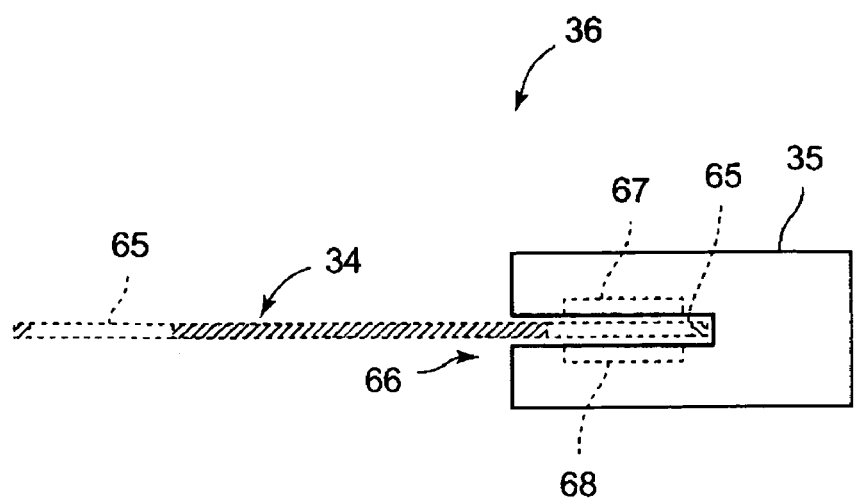
FIG. 10 is a side view of the rotary encoder in FIG. 3.
Figure 11A:
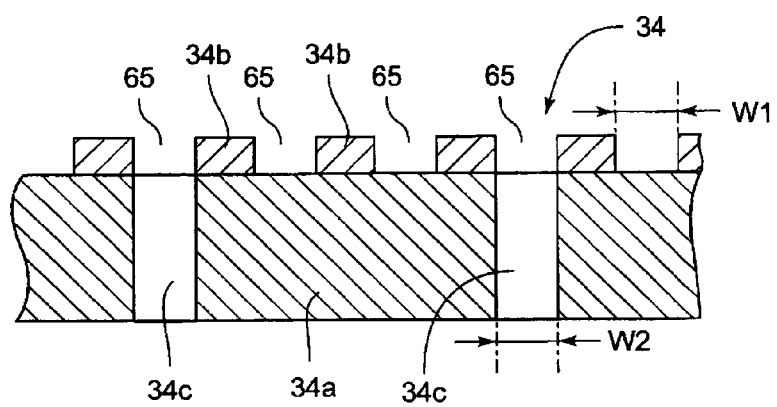
FIGS. 11A to 11C are partial cross-sectional views showing a structure of a rotary scale of FIG. 3.
Figure 11B:
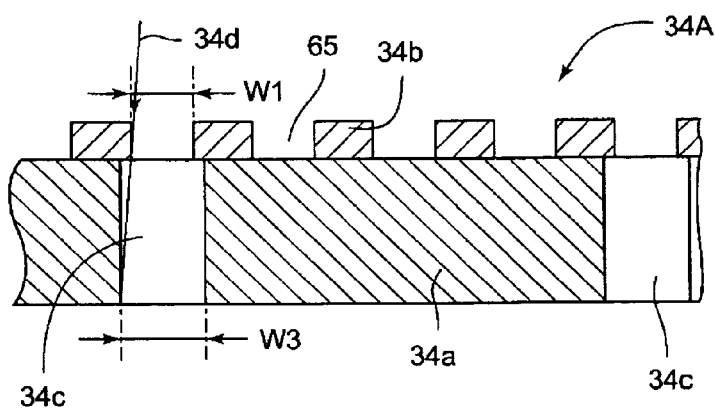
Figure 11C:
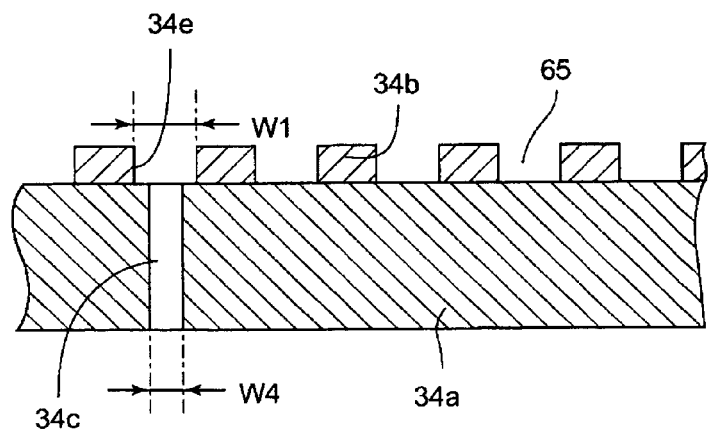
Figure 12:
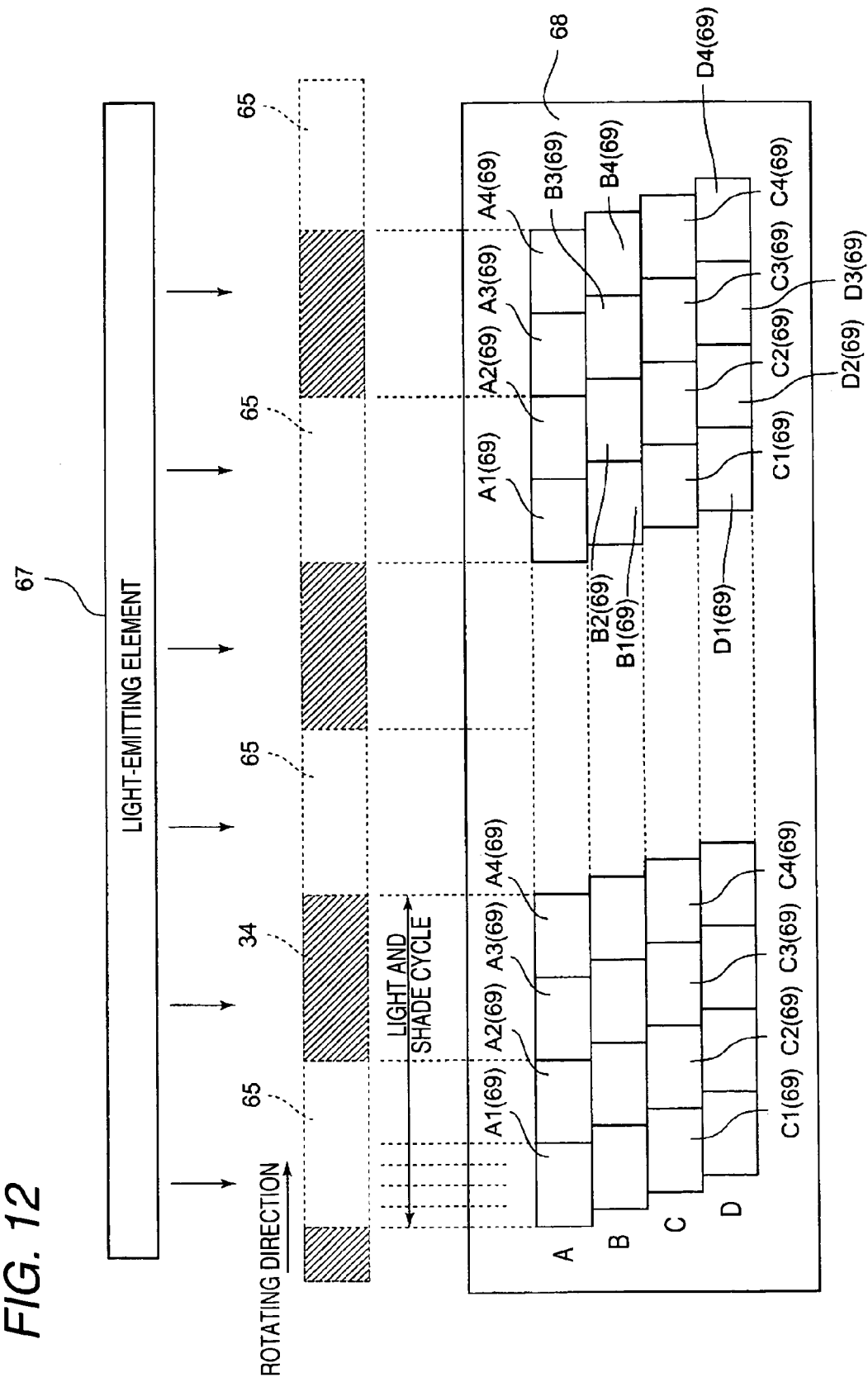
FIG. 12 is a schematic diagram showing the relationship between the board in FIG. 10 and its peripherals.

FIG. 8 is a schematic diagram of a part related to the rotary encoder 36 of FIG. 3; FIG. 9 is a front view of the rotary scale 34 in FIG. 3; FIG. 10 is a side view of the sensor 35 in FIG. 3; FIGS. 11A to C are partial cross-sectional views showing a structure of the rotary scale of FIG. 3; FIG. 12 is a schematic diagram showing the relationship between a board 68 disposed to the sensor 35 shown in FIG. 10 and its peripherals.

Figure 13:
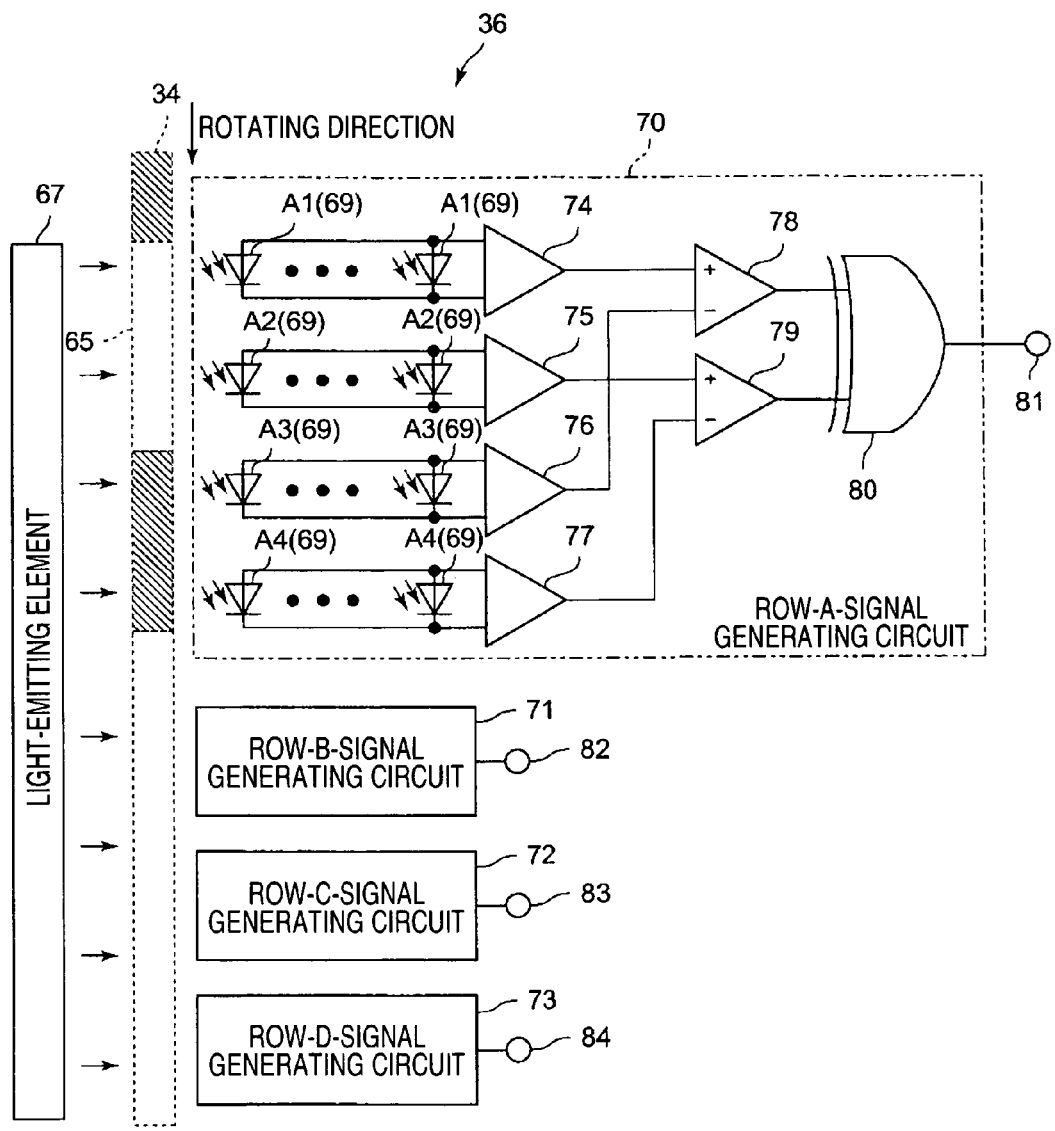
FIG. 13 is an electric circuit diagram of the rotary encoder of FIG. 3.
Figure 14:
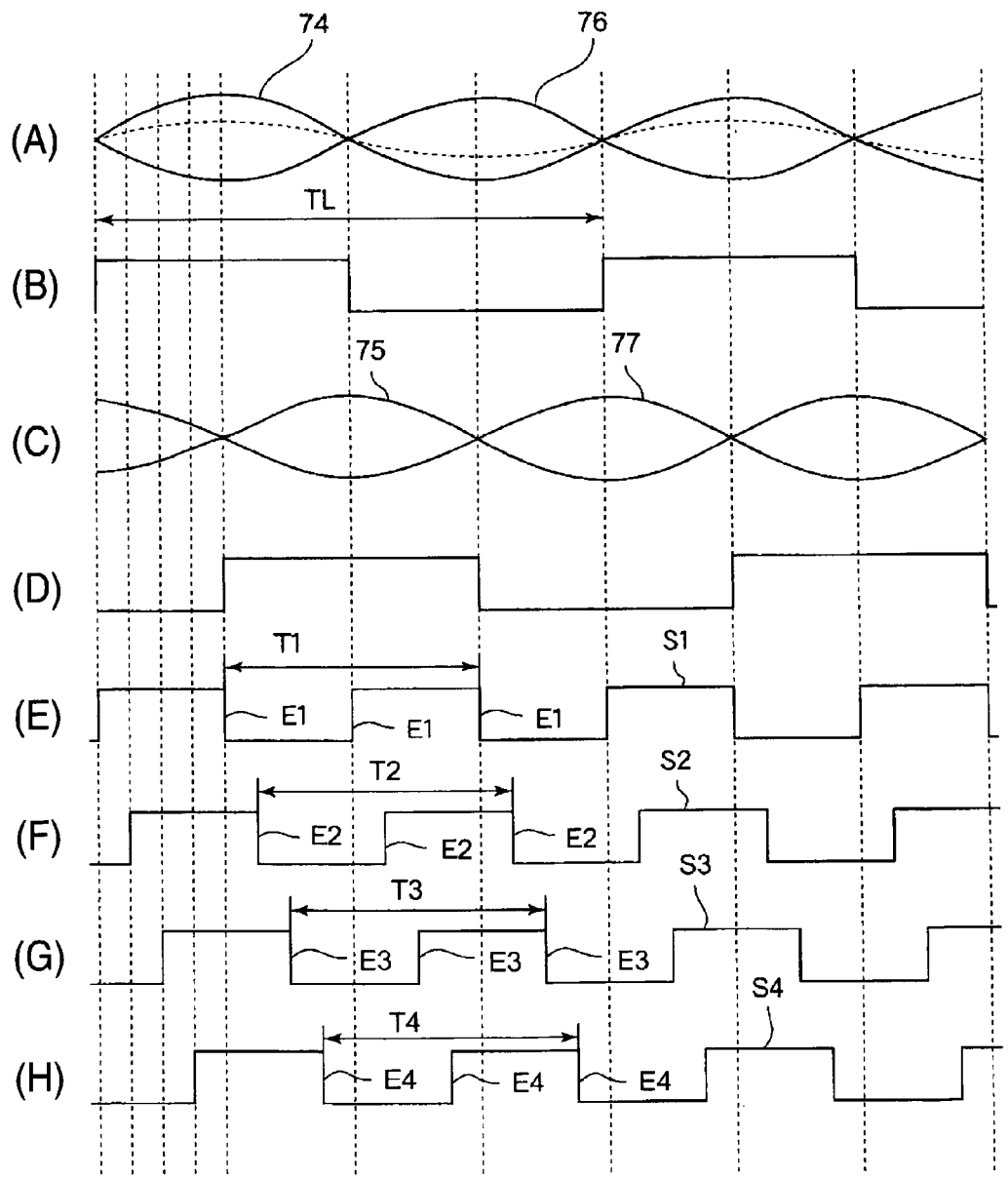
FIG. 14 shows signal waveforms generated by the rotary encoder.
Figure 15:
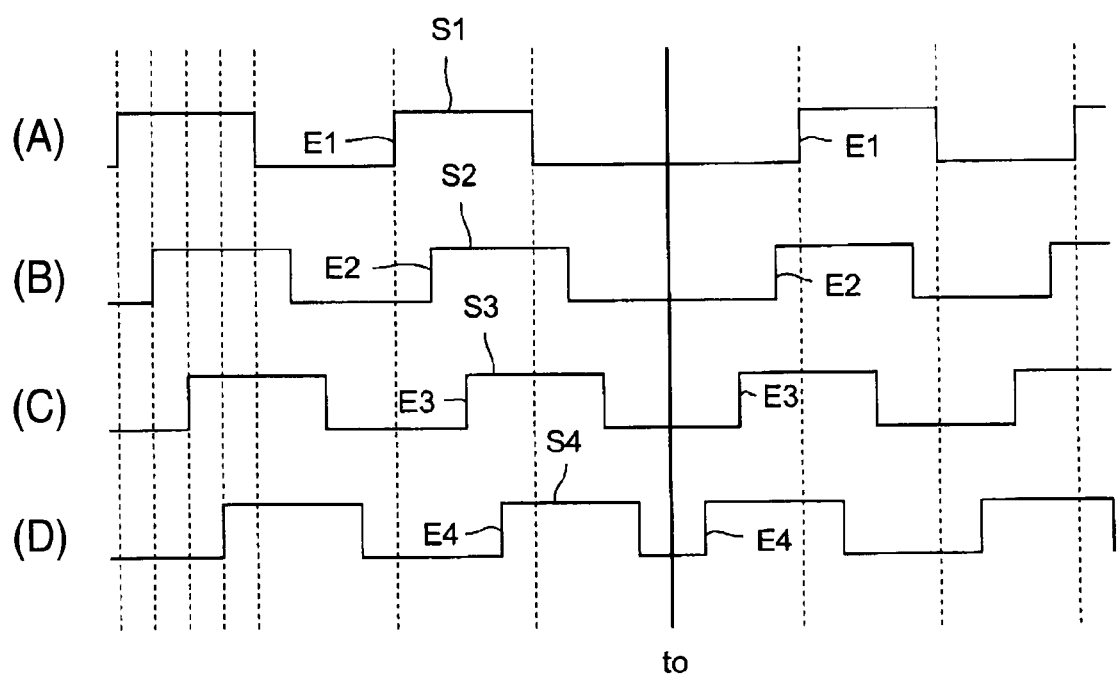
FIG. 15 shows signal waveforms generated by the rotary encoder when the rotating direction is changed.

FIG. 13 is an electric circuit diagram of the rotary encoder 36 of FIG. 3; and FIG. 14 shows signal waveforms generated by the rotary encoder 36 by the normal rotation of the rotary scale 34, wherein (A) shows level signal waveforms amplified by a first amplifier 74 and a third amplifier 76 shown in FIG. 13; (B) shows a signal waveform output from a first-differential-signal generating circuit 78 shown in FIG. 13; (C) shows level signal waveforms amplified by a second amplifier 75 and a fourth amplifier 77 shown in FIG. 13; (D) shows a signal waveform output from a second-differential-signal generating circuit 79 shown in FIG. 13; (E) shows a signal waveform output from an exclusive OR circuit 80 shown in FIG. 13; (F) shows a signal waveform output from a row-B-signal generating circuit 71 shown in FIG. 13; (G) is a signal waveform output from a row-C-signal generating circuit 72 shown in FIG. 13; and (H) is a signal waveform output from a row-D-signal generating circuit 73 shown in FIG. 13. FIG. 15 shows signal waveforms generated by the rotary encoder 36 when the rotating direction of the rotary scale 34 is changed, wherein (A) shows a signal waveform output from the exclusive OR circuit 80 shown in FIG. 13; (B) shows a signal waveform output from the row-B-signal generating circuit 71 shown in FIG. 13; (C) shows a signal waveform output from the row-C-signal generating circuit 72 shown in FIG. 13; and (D) shows a signal waveform output from the row-D-signal generating circuit 73 shown in FIG. 13.

The rotary scale 34 is, for example, a plastic thin plate and is formed in a disc shape shown in FIG. 9. As shown in FIG. 11A, the rotary scale 34 has a main body portion 34$a$ formed of polyethylene terephthalate (PET), and marks 34$b$ serving as graduations. The main body portion 34$a$ is transparent so as to allow light to pass therethrough. In this embodiment, the thickness of the main body portion 34$a$ is significantly thin, for example, 180 μm. Moreover, in FIGS. 11A to 11C, the marks 34$b$ are shown thick, but are actually set in a range of several μm to 20 μm. The marks 34$b$ are formed by attaching a non-transmissive material to a surface of the main body portion 34$a$ using printing or deposition. For this reason, light does not pass through the marks 34$b$.

In the rotary scale 34, 180 slits 65, each forming the space between the marks 34$b$, are formed in a direction perpendicular to the paper of FIG. 9. The 180 slits 65 are arranged at the same positions of the rotary scale 34 in a radial direction at regular angular intervals. That is, the 180 slits 65 are arranged at the regular angular intervals along an outer circumference of the rotary scale 34. An interval between adjacent slits 65 and the width of each of the slits 65 in an arrangement direction of the slits 65 (a circumferential direction of the rotary scale 34) are substantially equal to each other. In FIG. 9, for convenience, the slits 65 are displayed in the circumferential direction on a magnified scale, but the 180 slits 65 are actually formed in one round, and thus the width of each of the slits 65 in the circumferential direction is made significantly small. A through hole 34$c$ that has a width W2 equal to the width W1 of the slit 65 is formed to correspond to the slit 65 for every three slits 65 among the slits 65. The through hole 34$c$ prevents the occurrence of diffused reflection or refraction due to a decrease in the amount of light passing through the slit 65 caused by the ink mist attached to the slit 65.

As shown in FIG. 11B, the rotary scale 34 may have the through hole 34$c$ that has a width W3 larger than the width W1 of the slit 65. Further, as shown in FIG. 11B, the number of through holes 34$c$ to be provided may be a fourth of all the slits 65, not a third of all the slits 65 (see FIG. 11A). If the width W3 of the through hole 34$c$ becomes larger than the width W1 of the slit 65, light 34$c$ passing through the periphery of the mark 34$b$ rarely enter the main body portion 34$a$. If light 34$d$ enters the main body portion 34$a$, light 34$d$ enters a deep part of the main body portion 34$a$ due to a refractive index when incident. Then, a light-receiving range of a light-receiving element 69, which is described below, changes by the position of the light-receiving element 69, and thus the output signals are rarely stabilized. The structure shown in FIG. 11B does not have such problems.

The rotary scale 34 may have a structure shown in FIG. 11C. That is, the through hole 34$c$ may have a width W4 smaller than the width W1 of the slit 65. With this configuration, the strength of the main body portion 34$a$ can be kept. Light passing through the periphery of a boundary portion 34$e$ between the mark 34$b$ and the slit 65 is incident on the main body portion 34$a$ from the top surface. Therefore, light that is received by the light-receiving element 69 can be stabilized, and a light-receivable region can be prevented from being expanded.

Preferably, the through holes 34$c$ are respectively provided to correspond to slits 65 of a third to a tenth of all the slits 65. If the through holes are respectively provided between marks of a tenth or more of all the marks, more wastes pass through the scale, and thus the wastes are rarely attached to the rotary scale 34. Meanwhile, if the through holes 34$c$ are respectively provided between marks of a third or less of all the marks, the strength of the rotary scale 34 can be kept. Moreover, in view of strength balance, the through holes 34$c$ are preferably provided at predetermined regular intervals.

The rotary scale 34 rotates with the PF drive roller 6, as described above. That is, when the PF drive roller 6 makes a turn, the rotary scale 34 also makes a turn. When the peripheral length of the PF drive roller 6 is one inch, the resolution of the single rotary scale 34 is 180 (=1 in./180) dpi. The rotary scale 34 may be connected to the PF drive roller 6 with a gear or the like, as described above, so that, e.g., the rotary scale 34 makes two turns when the PF drive roller 6 makes a turn.

Referring to FIG. 10, the sensor 35 has a substantially rectangular parallelepiped housing. The sensor 35 has a recess 66 from one side (the left side in FIG. 10) toward the center of the housing. A light-emitting element 67 or a light emitter is disposed on one of two opposing surfaces (two vertically opposing surfaces in FIG. 10) of the recess 66, while a board 68 is disposed on the other surface. The board 68 has a plurality of light-receiving elements 69 or sensing elements (see FIG. 12), so that the portion of the board 68 serves as the photoreceiver (sensing portion) of the sensor 35. The sensor 35 holds part of the outer periphery of the rotary scale 34 in the recess. Thus the outer periphery of the rotary scale 34, that is, the portion of the rotary scale 34 where the slits 65 are formed is located between the light-emitting element 67 and the light-receiving elements 69.

The light-emitting element 67 is, for example, a light-emitting diode, which emits light having a good straightforwarding performance.

Referring to FIG. 12, the board 68 has the light-receiving elements 69 arranged in four rows along the rotating direction of the rotary scale 34. Hereinafter, the four rows of the light-receiving elements 69 are referred to as rows A, B, C, and D from the top of FIG. 12. The light-receiving elements 69 are, for example, a photodiode, which output signals of a level according to the amount of received light. Moreover, in FIG. 12, the main body portion 34a formed of the transparent member is not shown.

Assuming that the light-emitting element 67 emits parallel rays onto the board 68, as shown in FIG. 12, light and dark portions (light and shade) are formed on the surface of the board 68 at the same intervals as that of the slits 65 along the outer periphery of the rotary scale 34. Specifically, the portions of the board 68 corresponding to the slits 65 are irradiated with the light from the light-emitting element 67. The portions of the board 68 corresponding to the interval between the slits 65 of the rotary scale 34 are shielded from the light of the light-emitting element 67. Thus, one cycle of the light and dark portions formed on the surface of the board 68 (hereinafter, referred to as a light and shade cycle T) corresponds to the arrangement pitch of the slits 65 of the rotary scale 34. In other words, when the light-emitting element 67 irradiates the board 68 with parallel rays, the light and shade cycle T formed on the surface of the board 68 is the same as the pitch of the slits 65. Accordingly, when the rotary scale 34 rotates at equal speed, the light and shade cycle T formed on the surface of the board 68 becomes substantially constant.

When the light emitted from the light-emitting element 67 is not parallel rays, or is diffused light, the light and shade cycle T formed on the board 68 is narrow at the portion of the board 68 closest to the light-emitting element 67, and is wider with an increasing distance from the light-emitting element 67. Thus, in that case, even when the rotary scale 34 rotates at equal speed, the light and shade cycle T does not become constant.

The light-receiving elements 69 in rows A to D are each disposed over a plurality of light and shade cycles T (three cycles in FIG. 12) of the board 68. FIG. 12 shows the arrangement relationship among the light-receiving elements 69 in the case where the light from the light-emitting element 67 is parallel light. Each of the light-receiving elements 69 has a light-receiving surface of a size approximately one quarter of the light and shade cycle T formed on the board 68. In other words, each of the light-receiving elements 69 in each row has a size equal to one quarter of the light and shade cycle T. As shown in FIG. 11, a plurality of sets of four light-receiving elements 69 of a first light-receiving element A1 (69) (B1 (69), C1 (69), or D1 (69)); a second light-receiving element A2 (69) (B2 (69), C2 (69), or D2 (69)); a third light-receiving element A3 (69) (B3 (69), C3 (69), or D3 (69)); a fourth light-receiving element A4 (69) (B4 (69), C4 (69), or D4 (69)) corresponding to the light and shade cycle T is disposed in each of rows A to D from the left in the drawing.

The light-receiving elements 69 in four rows are disposed with a slight displacement with each other in the rotating direction of the rotary scale 34. More specifically, the four rows of light-receiving elements 69 are displaced one sixteenth of the light and shade cycle T with each other in the rotating direction of the rotary scale 34. Referring to FIG. 12, when the PF motor 5 rotates in the normal direction (in the direction in which the print paper P is fed to the delivery side) (when the rotary scale 34 rotates in the normal direction), the rotary scale 34 rotates from the left to the right of the drawing. In this case, row B is formed in a position shifted to the right of the light-receiving elements 69 in row A by one sixteenth of the light and shade cycle T. Row C is formed in a position shifted to the right of the light-receiving elements 69 in row A by two sixteenths of the light and shade cycle T. Row D is formed in a position shifted to the right of the light-receiving elements 69 in row A by three sixteenths of the light and shade cycle T.

In other words, referring to FIG. 12, for example, the light-receiving element A1 (69) at the left end of row A, the light-receiving element B1 (69) at the left end of row B, the light-receiving element C1 (69) at the left end of row C, and the light-receiving element D1 (69) at the left end of row D are displaced with each other in that order by one sixteenth of the light and shade cycle T (one cycle of light and shade) along the moving direction of the light and shade formed by the slits 65.

When the rotary scale 34 rotates with the PF drive roller 6, the slits 65 move between the light-emitting element 67 and the light-receiving elements 69 of the sensor 35. As the slits 65 moves, the light-receiving elements 69 output signals at a level depending on the amount of received light. More specifically, the light-receiving elements 69 corresponding to the slits 65 output high-level signals, while the light-receiving elements 69 corresponding to the interval between the slits 65 output low-level signals. Thus the light-receiving elements 69 output signal at a level varied in a cycle depending on the moving speed of the slits 65.

Referring to FIG. 13, the sensor 35 that configures the rotary encoder 36 includes a row-A-signal generating circuit 70 or first signal generating means having a plurality of row-A light-receiving elements 69, a row-B-signal generating circuit 71 or second signal generating means having a plurality of row-B light-receiving elements 69, a row-C-signal generating circuit 72 or third signal generating means having a plurality of row-C light-receiving elements 69, and a row-D-signal generating circuit 73 or fourth signal generating means having a plurality of row-D light-receiving elements 69.

The row-A-signal generating circuit 70 includes the row-A light-receiving elements 69, the first to fourth amplifiers 74, 75, 76, and 77, the first differential-signal generating circuit 78, the second differential-signal generating circuit 79, and an exclusive OR circuit 89.

As shown in FIG. 12, a plurality of sets of four light-receiving elements 69, the first light-receiving element A1 (69), the second light-receiving element A2 (69), the third light-receiving element A3 (69), and the fourth light-receiving element A4 (69) corresponding to the light and shade cycle T is arranged in row A. The first amplifier 74 connects to the row-A first light-receiving elements A1 (69) in parallel. The first light-receiving elements A1 (69) each output a signal at a level responsive to their respective received light amount. The first amplifier 74 amplifies the level signals output from the first light-receiving elements A1 (69).

Similarly, the second amplifier 75 connects to the A-row second light-receiving elements A2 (69) in parallel. The second amplifier 75 amplifies the level signals output from the second light-receiving elements A2 (69), and outputs them. The third amplifier 76 connects to the row-A third light-receiving elements A3 (69) in parallel. The third amplifier 76 amplifies the level signals output from the third light-receiving elements A3 (69), and outputs them. The fourth amplifier 77 connects to the row-A fourth light-receiving elements A4 (69) in parallel. The fourth amplifier 77 amplifies the level signals output from the fourth light-receiving elements A4 (69), and outputs them.

As shown in FIG. 12, the first light-receiving elements A1 (69) and the third light-receiving elements A3 (69) are each formed on the board 68 in such a manner as to be displaced a half of the light and shade cycle T with respect to each other. Accordingly, as shown in FIG. 14(A), the signal waveform amplified by the first amplifier 74 and the signal waveform amplified by the third amplifier 76 are displaced a half of the light and shade cycle T with respect to each other. Similarly, the second light-receiving elements A2 (69) and the fourth light-receiving elements A4 (69) are each formed on the board 68 in such a manner as to be displaced a half of the light and shade cycle T with respect to each other. Accordingly, as shown in FIG. 14(C), the signal waveform amplified by the second amplifier 75 and the signal waveform amplified by the fourth amplifier 77 are displaced a half of the light and shade cycle T with respect to each other. The time of the cycle TL of the signal waveforms output from the amplifiers 74, 75, 76, and 77 is the same as that of the light and shade cycle T.

The first amplifier 74 and the third amplifier 76 output amplified level signals to the first-differential-signal generating circuit 78. The level signal amplified by the first amplifier 74 is input to a noninverting input terminal of the first-differential-signal generating circuit 78, while the level signal amplified by the first-differential-signal generating circuit 78 is input to an inverting input terminal of the first-differential-signal generating circuit 78.

When the level of the signal input to the noninverting input terminal (the signal output from the first amplifier 74) is higher than that of the signal input to the inverting input terminal (the signal output from the third amplifier 76), the first-differential-signal generating circuit 78 outputs a high-level signal; when the level of the signal input to the noninverting input terminal is lower than that of the signal input to the inverting input terminal, the first-differential-signal generating circuit 78 outputs a low-level signal. Thus the first-differential-signal generating circuit 78 outputs a digital-waveform signal. In other words, as shown in FIG. 14(B), the first-differential-signal generating circuit 78 outputs a digital-waveform signal with a duty of approximately 50% substantially in the same cycle as that output from the third light-receiving element A3 (69).

The second amplifier 75 and the fourth amplifier 77 output amplified level signals to the second-differential-signal generating circuit 79. The level signal amplified by the second amplifier 75 is input to a noninverting input terminal of the second-differential-signal generating circuit 79, while the level signal amplified by the fourth amplifier 77 is input to an inverting input terminal of the second-differential-signal generating circuit 79.

When the level of the signal input to the noninverting input terminal (the signal output from the second amplifier 75) is higher than that of the signal input to the inverting input terminal (the signal output from the fourth amplifier 77), the second-differential-signal generating circuit 79 outputs a high-level signal; when the level of the signal input to the noninverting input terminal is lower than that input to the inverting input terminal, the second-differential-signal generating circuit 79 outputs a low-level signal. Thus the second-differential-signal generating circuit 79 outputs a digital-waveform signal. In other words, as shown in FIG. 14(D), the second-differential-signal generating circuit 79 outputs a digital-waveform signal with a duty of approximately 50% substantially in the same cycle as that of the level signal output from the fourth light-receiving element A4 (69).

As shown in FIG. 12, the first light-receiving elements A1 (69) and the second light-receiving elements A2 (69) are each formed on the board 68 in such a manner as to be displaced a quarter of the light and shade cycle T with respect to each other. Accordingly, the output signal of the first-differential-signal generating circuit 78 shown in FIG. 14(B) and the output signal of the second-differential-signal generating circuit 79 shown in FIG. 14(D) are displaced a quarter of the light and shade cycle T with respect to each other.

The output signal of the first-differential-signal generating circuit 78 and the output signal of the second-differential-signal generating circuit 79 are input to the exclusive OR circuit 80. When both of the two inputs are on a high level or a low level, the exclusive OR circuit 80 outputs a low-level signal; when only one of the two inputs is on a high level, it outputs a high-level signal. Specifically, as shown in FIG. 14(E), the exclusive OR circuit 80 outputs a signal S1 with a cycle about a half of that of the level signal of the light-receiving elements 69. When the rotating direction of the rotary scale 34 is changed at time t0, the exclusive OR circuit 80 outputs the signal S1 shown in FIG. 15(A).

The output signal of the exclusive OR circuit 80 is output from an output terminal 81 of the rotary encoder 36. The output signal of the exclusive OR circuit 80 (the output signal of the row-A-signal generating circuit 70) S1 corresponds to a first output signal.

Since the internal structures of the row-B-signal generating circuit 71, the row-C-signal generating circuit 72, and the row-D-signal generating circuit 73 are the same as that of the row-A-signal generating circuit 70, drawings thereof and descriptions will be omitted. The row-B signal generating circuit 71, the row-C-signal generating circuit 72, and the row-D-signal generating circuit 73 respectively output signals S2, S3, and S4 with a cycle approximately a half of the level signal of the light-receiving elements 69 shown in FIGS. 14(F), 14(G), and 14(H). When the rotating direction of the rotary scale 34 is changed at time t0, the row-B-signal generating circuit 71, the row-C-signal generating circuit 72, and the row-D-signal generating circuit 73 respectively output signals S2, S3, and S4 shown in FIGS. 15(B), 15(C), and 15(D).

As has been described, the light-receiving elements 69 in row B are displaced to the right of the light-receiving elements 69 in row A by a sixteenth of the light and shade cycle T. The light-receiving elements 69 in row C are displaced to the right of the light-receiving elements 69 in row A by two sixteenths of the light and shade cycle T. The light-receiving elements 69 in row D are displaced to the right of the light-receiving elements 69 in row A by three sixteenths of the light and shade cycle T. Therefore, as shown in FIGS. 14(E) to 14(H), when the rotary scale 34 rotates in the normal direction, the phase of the output signal S2 of the row-B-signal generating circuit 71 is basically delayed a sixteenth of the light and shade cycle T behind the phase of the output signal S1 of the row-A-signal generating circuit 70. The phase of the output signal S3 of the row-C-signal generating circuit 72 is basically delayed two sixteenths of the light and shade cycle T behind the phase of the output signal S1 of the row-A-signal generating circuit 70. The phase of the output signal S4 of the row-D-signal generating circuit 73 is basically delayed three sixteenths of the light and shade cycle T behind the phase of the output signal S1 of the row-A-signal generating circuit 70.

As shown in FIG. 13, the output signal S2 of the row-B-signal generating circuit 71 is output from an output terminal 82 of the rotary encoder 36; the output signal S3 of the row-C-signal generating circuit 72 is output from an output terminal 83 of the rotary encoder 36; and the output terminal S4 of the row-D-signal generating circuit 73 is output from an output terminal 84 of the rotary encoder 36. In other words, the rotary encoder 36 has four output terminals 81, 82, 83, and 84. The output signal S2 of the row-B-signal generating circuit 71 corresponds to a second output signal; the output signal S3 of the row-C-signal generating circuit 72 corresponds to a third output signal; and the output signal S4 of the row-D-signal generating circuit 73 corresponds to a fourth output signal.

Referring back to FIG. 8, the four output terminals 81, 82, 83, and 84 connect to the controller 37 with four signal lines 86, 87, 88, and 89, respectively.

(Method for Controlling Printer)

The printer 1 with this arrangement reciprocates the carriage 3 driven by the CR motor 4 in the main scanning direction MS while feeding the print paper P taken from the hopper 11 into the printer 1 with the paper feed roller 12 and the separation pad 13 in the subscanning direction SS with the PF drive roller 6 driven by the PF motor 5. While the carriage 3 is reciprocating, the print head 2 jets out ink drops to print on the print paper P. Upon completion of printing to the print paper P, the print paper P is delivered to the outside of the printer 1 with the delivery drive roller 15 and so on.

When the print paper P is fed in the subscanning direction SS, the PF motor 5 rotates the PF drive roller 6. On rotation of the PF drive roller 6, the rotary scale 34 rotates with the PF drive roller 6. On rotation of the rotary scale 34, the rotary encoder 36 outputs the four signals S1, S2, S3, and S4. The output signals S1, S2, S3, and S4 are input to a predetermined processing circuit (e.g., the ASIC 51) of the controller 37. To control the PF motor 5 and so on, the rotational position and speed of the PF motor 5 are determined from the output signals S1, S2, S3, and S4 of the rotary encoder 36.

A method for determining the rotational position and speed and rotating direction of the PF motor 5 will be described in sequence.

A method for determining the rotational position of the PF motor 5 will first be described. The rotational position of the PF motor 5 is determined using edges E1, E2, E3, and E4 at which the levels of the output signals S1, S2, S3, and S4, shown in FIGS. 14(E) to 14(H), change (rise and fall). In other words, the rotational position of the PF motor 5 is determined by counting the number of the edges E1, E2, E3, and E4 output from the rotary encoder 36. The four output signals S1, S2, S3, and S4 are expressed as output signals S hereinbelow, if collectively expressed. The four edges E1, E2, E3, and E4 are expressed as edges E, if collectively expressed.

When the PF motor 5 rotates in both of the normal and reverse directions, the rotational position of the PF motor 5 is determined from the determination on the rotating direction, to be described later, and the number of the edges E. Here a case where the PF motor 5 rotates only in one direction will be described.

For example, where the PF motor 5 rotates in the normal direction, the edges E are input when the edges E1, E2, E3, and E4 are output from the rotary encoder 36 in that order, as shown in FIGS. 14(E) to 14(H), so that the rotational position of the PF motor 5 can be determined appropriately by a predetermined processing circuit (e.g., the ASIC 51) of the controller 37.

The cycle of the output signals S is approximately a half of that of the level signal of the light-receiving elements 69. The signals S1, S2, S3, and S4 are basically sequentially output with a phase difference of one sixteenth of the light and shade cycle T. Accordingly, when the rotational speed of the PF motor 5 increases to output high-frequency signals S from the rotary encoder 36, a phenomenon in which the edges E1, E2, E3, and E4 are not output in that order, e.g., two edges E overlapped or the order of the output edges E are reversed, because of the characteristic of the electrical circuit of the rotary encoder 36. To determine the rotational position of the PF motor 5 using the four output signals S under such a phenomenon due to the high-frequency signals, the structure of a processing circuit for determining the rotational position is complicated or the processing load on the processing circuit is increased.

Accordingly, in this embodiment, when the PF motor 5 rotates at or below a specified rotational speed at which the foregoing problems due to high-frequency signals do not occur, a predetermined processing circuit determines the rotational position of the PF motor 5 using all the four output signals S. That is, the processing circuit determines the rotational position of the PF motor 5 by counting the number of the edges E of each of the four output signals S. On the other hand, when the PF motor 5 rotates at or over a specified rotational speed at which the foregoing problems due to high-frequency signals can occur, a predetermined processing circuit determines the rotational position of the PF motor 5 using the two output signals S1 and D3 or the two output signals S2 and S4. That is, the processing circuit determines the rotational position of the PF motor 5 by counting the number of the respective edges E1 and E3 of the output signals S1 and S3, or by counting the number of the respective edges E2 and E4 of the output signals S2 and S4.

Thus, in this embodiment, the predetermined processing circuit for determining the rotational position switches (selects) between determining the rotation position using the four output signals S and determining it using two output signals S according to the rotational speed of the PF motor 5. The switching (selection) by the processing circuit is made according to the information on the rotational speed of the PF motor 5 determined from the output signals S of the rotary encoder 36 or the instruction from the CPU 39 based on the print mode information sent from the computer 50 or the like.

The PF motor 5 is controlled on the basis of the information on the rotational position of the PF motor 5 determined from the four or two output signals S. For example, the PF motor 5 is PID-controlled on the basis of the rotational position of the PF motor 5 determined by the ASIC 51.

The rotating direction of the PF motor 5 is determined as follows: the rotating direction of the PF motor 5 is determined from the edges E of one output signal S and the output level of the other output signals S at that time. For example, as shown in FIG. 15, if the output signals S2, S3, and S4 are at low levels when the edge E1 at the rising of the output signal S1 is detected, it is determined that the PF motor 5 rotates in the normal direction. If the output signals S2, S3, and S4 are at high levels when the edge E1 at the rising of the output signal S1 is detected, it is determined that the PF motor 5 rotates in the reverse direction. If the output signal S1 is at a high level and the output signals S3 and S4 are at low levels when the edge E2 at the rising of the output signal S2 is detected, it is determined that the PF motor 5 rotates in the normal direction. On the other hand, if the output signal S1 is at a low level and the output signals S3 and S4 are at high levels when the edge E2 at the rising of the output signal S2 is detected, it is determined that the PF motor 5 rotates in the reverse direction. Similarly, the rotating direction of the PF motor 5 is determined using the edges E3 and E4 of the output signals S3 and S4 and the output level of the other output signals S.

Accordingly, if the above-described problems due to high-frequency signals such that the signals are output with two edges E overlapped with each other or the order of the edges E is reversed occur, a processing circuit of the controller 37 (for example, ASIC 51) cannot appropriately determine the rotating direction of the PF motor 5.

Accordingly, in this embodiment, like the detection of the rotational position, when the PF motor 5 rotates at a speed less than the predetermined rotation speed, or equal to or less than the predetermined rotational speed, and the problems due to the high-frequency signals do not occur, the processing circuit that detects the rotating direction detects the rotating direction using all the four output signals S and the four edges E. That is, the rotating direction of the PF motor 5 is detected by the output level of another output signal S when any one edge E among the edges E is detected. Further, when the PF motor 5 rotates at a speed that exceeds the predetermined rotational speed or is equal to or more than the predetermined rotational speed, and the problems due to the high-frequency signals occur, the predetermined processing of detecting the rotating direction detects the rotating direction of the PF motor 5 using two signals of the output signals S1 and S3 or two signals of the output signals S2 and S4. That is, the rotating direction of the PF motor 5 is detected by the edges E1 and E3 of the output signals S1 and S3, and the output level of another output signal S when one edge E is detected, or by the edges E2 and E4 of the output signals S2 and S4, and the output level of another output signal S when one edge E is detected.

Thus, in this embodiment, the processing circuit for determining the rotating direction switches (selects) between determining the rotating direction using four output signals S and determining the rotating direction using two output signals S, depending on the rotational speed of the PF motor 5. The switching (selection) by the processing circuit is made according to the instruction from the CPU 39 based on the information on rotational speed of the PF motor 5, as described above.

Printer 1 is controlled on the basis of the information on the rotating direction of the PF motor determined using four or two output signals S.

For example, the rotational position of the PF motor 5 is determined from the information on the rotating direction, and the PF motor 5 is PID-controlled on the basis of the determination.

Next, the detection method of the rotation speed of the PF motor 5 will be described. The rotation speed of the PF motor 5 is detected using a time (cycle) from a rising edge (or falling edge) E of each output signal S to a next rising edge (or falling edge) E. For example, the rotation speed of the PF motor 5 is detected using the cycles T1, T2, T3, and T4 shown in (E) to (H) of FIG. 14.

For this reason, even if two edges E are output to overlap each other or a sequence of the output edges E is reversed, a predetermined processing circuit (for example, the ASIC 51) of the control circuit 37 that detects the rotation speed can appropriately detect the rotation speed of the PF motor 5.

In this embodiment, the rotation speed of the PF motor 5 is detected using all the four output signals S, regardless of the rotation speed of the PF motor 5. Further, a predetermined control of the printer 1 is performed on the basis of information about the rotation speed of the PF motor 5 detected using the four output signals S. For example, the PID control of the PF motor 5 is performed on the basis of information about the rotation speed of the PF motor 5 detected by the ASIC 51.

As described above, when the PF motor 5 rotates at the speed less than the predetermined rotation speed or equal to or less than the predetermined rotation speed, the ASIC 51 detects the rotation position of the PF motor 5 using the four output signals S. Meanwhile, when the PF motor 5 rotates that is equal to or more than the predetermined rotation speed or exceeds the predetermined rotation speed, the ASIC 51 detects the rotation speed of the PF motor 5 using the two output signals S. For this reason, as shown in FIG. 7, when the rotation speed is equal to or more than the predetermined rotation speed V1, for example, only the target rotation speeds corresponding to the rotation positions detected from the output signals S1 and S3 are set in the target speed table. Further, if the rotation speed is less than the predetermined rotation speed V1, the target rotation speeds corresponding to the rotation positions detected from the output signals S1, S2, S3, and S4 is set in the target speed table. With this configuration, the amount of data of the target speed table can be reduced.

(Main Effects of First Embodiment)

As described above, in the first embodiment, the rotary encoder 36 has the through holes 34c that are provided to correspond to some of all the slits 65 for each predetermined interval. Therefore, a plurality of slits 65 can be formed, without worrying the wastes, such as the ink mist and so on, or the strength.

In addition, the rotary encoder 36 outputs four output signals S from the level signals output from the light-receiving elements 69 arranged in four rows on one board 68. The signals S are generated from the level signal waveforms of the four light-receiving elements A1 (69) to A4 (69), B1 (69) to B4 (69), C1 (69) to C4 (69), and D1 (69) to D4 (69) arranged at intervals corresponding to one quarter of the light and shade cycle T on the board 68. Therefore, the output signals S have double the frequency of the level signals and the turning points of all the signals correspond to the turning points of the level signals of the light-receiving elements 69. In other words, the cycles T1 to T4 of the signals S are a half of the cycle TL of the level signal waveform, and the edges E are generated in one-to-one correspondence with the light-receiving elements 69. The rotary encoder 36 can therefore obtain such a resolution that slits are provided at intervals of one eighth of the interval of the slits 65 on the rotary scale 34. In other words, the rotary encoder 36 can obtain a resolution of the position and speed eight times higher than that with the slits 65.

As a result, a rotary scale 34 of the same size and accuracy as conventional ones can provide a resolution of the position and speed eight times as high as the conventional ones. In other words, the rotary encoder 36 can output high-resolution output signals S. Also a rotary scale 34 smaller than conventional ones can provide a resolution of the position and speed equal to the conventional ones.

In this embodiment, according to the rotation speed of the PF motor 5, the control of the printer 1 on the basis of the two output signals of the output signal S1 and the output signal S3 or the two output signals of the output signal S2 and the output signal S4, or the control of the printer 1 on the basis of the four output signals of the output signals S1, S2, S3, and S4 is switchably (selectably) performed. For this reason, when the problems due to the high-frequency signals do not occur even through the control is performed using the four output signals S, the control of the printer 1 can be performed with higher resolution on the basis of the four output signals S. Further, in a case where the problems due to the high-frequency signals occur when the control is performed using the four output signals S, the control of the printer 1 can be performed using the two output signal S1 and the output signal S3 or the two output signals of the output signal S2 and the output signal S4, whose phases are sifted from each other by an eighth of a brightness cycle T. For this reason, the problems due to the high-frequency signals can be suppressed, and the configuration of a circuit that processes the output signals from the rotary encoder 36 can be simplified.

In this embodiment, when the rotation speed of the PF motor 5 is equal to or more than the predetermined speed, or exceeds the predetermined speed, the rotation position and the rotation direction of the PF motor 5 are detected from the two output signals of the output signal S1 and the output signal S3 or the two output signals of the output signal S2 and the output signal output from the rotary encoder 36, and the control is performed on the basis of the detection result. Further, when the rotation speed of the PF motor 5 is less than the predetermined speed, or is equal to or less than the predetermined speed, the rotation position and the rotation direction of the PF motor 5 are detected from the four output signals S output from the rotary encoder 36.

In case of the PF motor 5, the positional accuracy of the PF motor 5 is demanded at the time of the stop, not at the time of the rotation. In this embodiment, before the PF motor 5 that rotates the rotation speed less than the predetermined speed or equal to or less than the predetermined speed stops, the rotation position or the rotation direction of the PF motor 5 can be detected from the four output signals S, and the control of the PF motor 5 can be performed on the basis of the detection result. Further, when the PF motor 5 rotates at a speed that is equal to or more than the predetermined speed or exceeds the predetermined speed, the rotation position or the rotation direction of the PF motor 5 is detected from the two output signals, and the control of the PF motor 5 is performed on the basis of the detection result. Even in this case, there is no problem in view of the positional accuracy.

In this embodiment, the rotation speed of the PF motor 5 is detected from the four output signals S output from the rotary encoder 36, regardless of the rotation speed of the PF motor 5, and the control is performed on the basis of the detection result. For this reason, the accurate control of the PF motor 5 based on the more rotation speed information can be performed.

Second Embodiment

Figure 16:
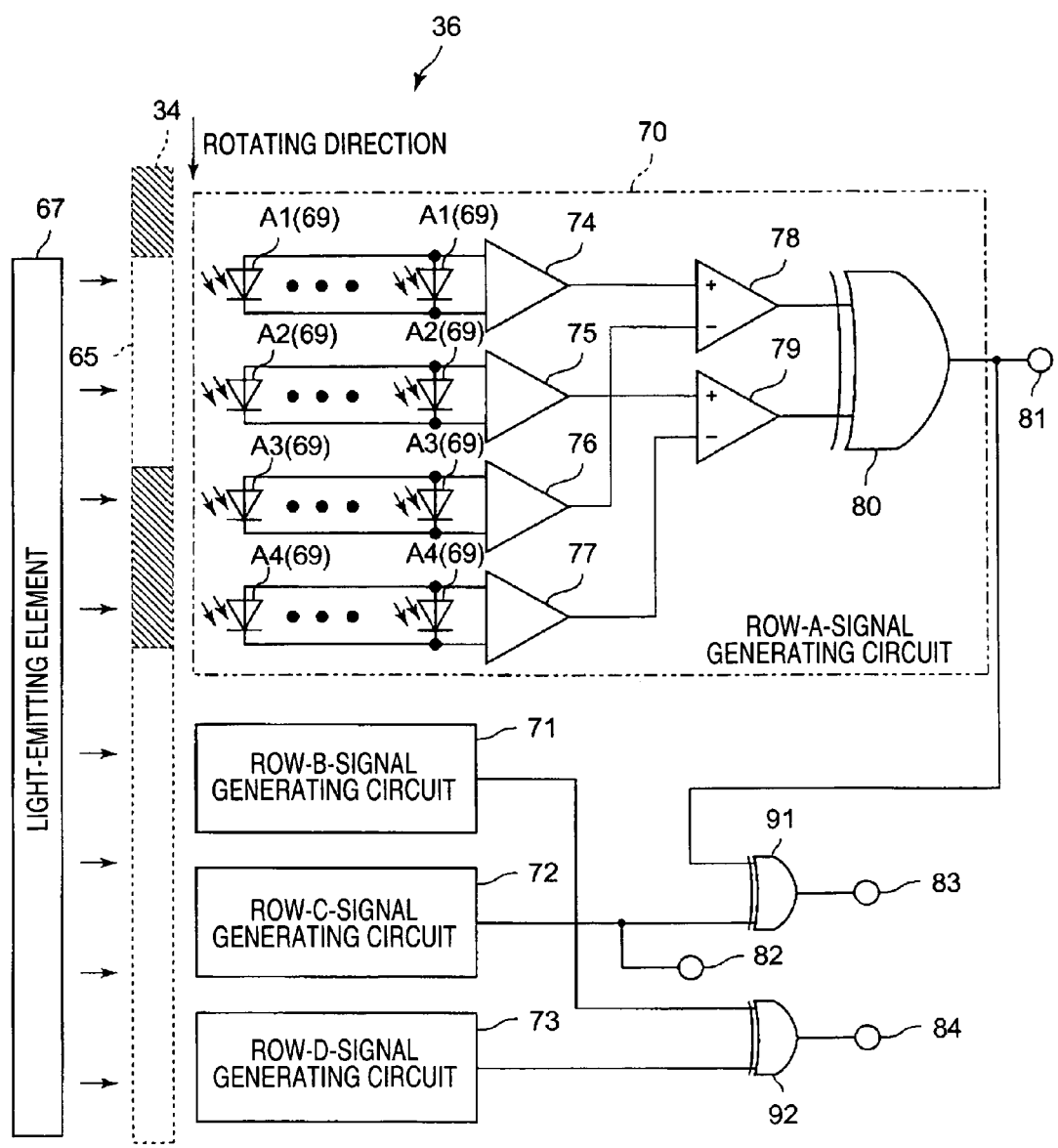
FIG. 16 is an electric circuit diagram of a rotary encoder according to a second embodiment of the invention.
Figure 17:
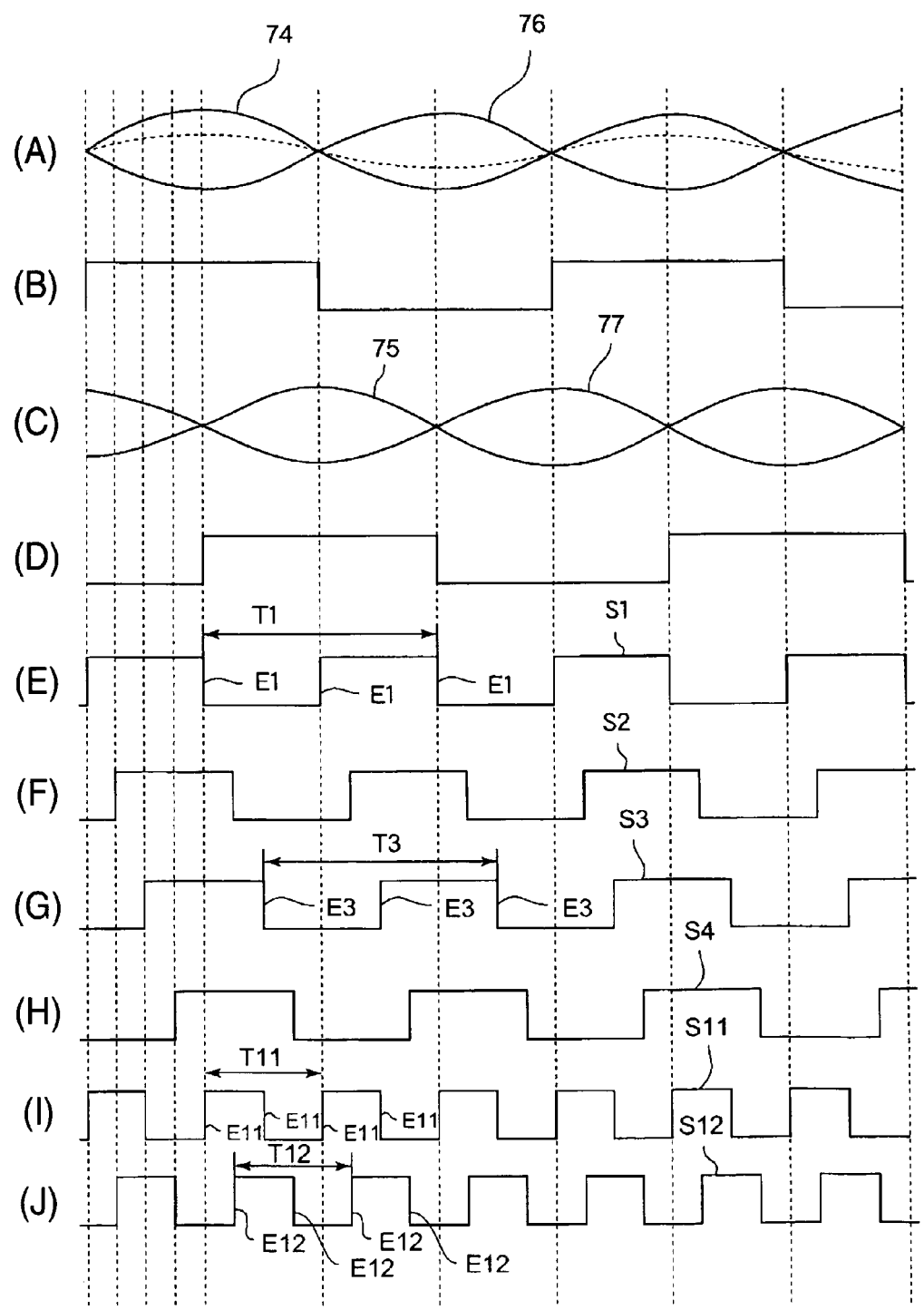
FIG. 17 shows signal waveforms generated by the rotary encoder according to the second embodiment.

FIG. 16 is an electric circuit diagram of a rotary encoder 36 according to a second embodiment of the invention; and FIG. 17 shows signal waveforms generated by the rotary encoder 36 by the normal rotation of a rotary scale 34 according to the second embodiment, wherein (A) shows level signal waveforms amplified by a first amplifier 74 and a third amplifier 76 shown in FIG. 16; (B) shows a signal waveform output from a first-differential-signal generating circuit 78 shown in FIG. 16; (C) shows level signal waveforms amplified by a second amplifier 75 and a fourth amplifier 77 of FIG. 16; (D) shows a signal waveform output from a second-differential-signal generating circuit 79 of FIG. 16; (E) shows a signal waveform output from an exclusive OR circuit 80 shown in FIG. 16; (F) shows a signal waveform output from a row-B-signal generating circuit 71 shown in FIG. 16; (G) shows a signal waveform output from a row-C-signal generating circuit 72 shown in FIG. 16; (I) shows a signal waveform output from a row-D-signal generating circuit 73 shown in FIG. 16; (I) shows a signal waveform output from a first exclusive OR circuit 91 of FIG. 16; and (J) shows a signal waveform output from a second exclusive OR circuit 92 of FIG. 16.

Although the configurations of the rotary scale 34 of the rotary encoder 36 are identical, the first embodiment and the second embodiment are different in the structure of the electric circuit of the rotary encoder 36. Because of the difference in the structure of the electric circuit, signals output from the rotary encoder 36 are also different. Since the other structures of the second embodiment are identical to those of the first embodiment, the difference will be principally described. In the second embodiment, components identical to those of the first embodiment are given the same reference numerals and descriptions thereof will be simplified or omitted. Illustrations and descriptions on components identical to those of the first embodiment will be omitted.

Referring to FIG. 16, the rotary encoder 36 of this embodiment includes the row-A-signal generating circuit 70, the row-B-signal generating circuit 71, the row-C-signal generating circuit 72, and the row-D-signal generating circuit 73 which are described in the first embodiment. The row-A-signal generating circuit 70, the row-B-signal generating circuit 71, the row-C-signal generating circuit 72, and the row-D-signal generating circuit 73 output the output signal S1, S2, S3, and S4 shown in FIGS. 17(E) to 17(H), respectively. In addition, the rotary encoder 36 of this embodiment includes a first output exclusive OR circuit 91 and a second output exclusive OR circuit 92.

The first output exclusive OR circuit 91 receives the signal S1 output from the row-A-signal generating circuit 70 and the signal S3 output from the row-C-signal generating circuit 72. The first output exclusive OR circuit 91 generates a first output exclusive OR signal S11 that is the exclusive OR of the output signal S1 and the output signal S3, and outputs it. In other words, the first output exclusive OR circuit 91 generates and outputs the first output exclusive OR signal S11 with a cycle approximately a half of the cycle of the output signals S1 and S3, as shown in FIG. 17(I).

The second output exclusive OR circuit 92 receives the signal S2 output from the row-B-signal generating circuit 71 and the signal S4 output from the row-D-signal generating circuit 73. The second output exclusive OR circuit 92 generates a second output exclusive OR signal S12 that is the exclusive OR of the output signal S2 and the output signal S4, and outputs it. In other words, the second output exclusive OR circuit 92 generates and outputs the second output exclusive OR signal S12 with a cycle approximately a half of the cycle of the output signals S2 and S4, as shown in FIG. 17(J).

The output signals S1 and S2 are out of phase with each other by one sixteenth of the light and shade cycle T. Accordingly, the first output exclusive OR signal S11 and the second output exclusive OR signal S12 are also out of phase with each other by one sixteenth of the light and shade cycle T, as shown in FIGS. 17(I) and 17(J).

The rotary encoder 36 of this embodiment also has four output terminals 81, 82, 83, and 84 as in the first embodiment. Referring to FIG. 15, the signal S1 of the row-A-signal generating circuit 70 (the exclusive OR circuit 80) is output from the output terminal 81, while the signal S3 of the row-C-signal generating circuit 72 is output from the output terminal 82. The first output exclusive OR signal S11 output from the first output exclusive OR circuit 91 is output from the output terminal 83, while the second output exclusive OR signal S12 output from the second output exclusive OR circuit 92 is output from the output terminal 84. In place of the output signal S1 of the row-A-signal generating circuit 70 and the output signal S3 of the row-C-signal generating circuit 72, the signal S2 of the row-B-signal generating circuit 71 and the signal S4 of the row-D-signal generating circuit 73 may be output from the rotary encoder 36.

As in the first embodiment, the four output terminals 81, 82, 83, and 84 connect to the controller 37 via the four signal lines 86, 87, 88, and 89, respectively (refer to FIG. 8).

In this embodiment, the signals output from the rotary encoder 36 are different from those from the rotary encoder 36 of the first embodiment. Thus, a method for determining the rotational position and speed and the rotating direction of the PF motor 5 is different from that of the first embodiment. The method for determining the rotational position and speed and rotating direction of the PF motor 5 will be described in sequence.

The method for determining the rotational position of the PF motor 5 will first be described. The rotational position of the PF motor 5 is determined by counting the number of the edges E1 and E3 of the output signals S1 and S3 shown in FIGS. 17(E) and 17(G), respectively, or the edges E11 and E12 of the first output exclusive OR signal S1 and the second output exclusive OR signal S12 shown in FIGS. 17(I) and 17(J), respectively.

More specifically, in this embodiment, when the PF motor 5 rotates at the rotational speed less than the predetermined rotational speed or equal to or less than the predetermined rotational speed, and the problems due to the high-frequency signals do not occur, a predetermined processing circuit (for example, the ASIC 51) that detects the rotational position detects the rotational position of the PF motor 5 by counting the number of the edges E11 and E12 of the high-frequency first and second exclusive OR signals S11 and S12. Further, when the PF motor 5 rotates at the rotational speed that is equal to or more than the predetermined rotational speed or exceeds the predetermined rotational speed, and the problems due to the high-frequency signals occur, the predetermined processing circuit that detects the rotational position detects the rotational position of the PF motor 5 by counting the number of the edges E1 and E3 of the low-frequency output signals S1 and S3.

Thus, in this embodiment, a predetermined processing circuit for determining the rotational position switches (selects) between determining the rotational position using the first output exclusive OR signal S11 and the second output exclusive OR signal S12 of high frequency and determining the rotational position using the output signals S1 and S3 of low frequency. The switching (selection) of the processing circuit is made according to instruction from the CPU 39 based on the information on the rotational speed of the PF motor 5 and so on, as in the first embodiment.

The printer 1 is controlled on the basis of the information on the rotational position of the PF motor 5 determined from the first output exclusive OR signal S11 and the second output exclusive OR signal S12 or two output signals S1 and S3. The PID control of the PF motor 5 is made on the basis of the information such as the rotational position of the PF motor 5 determined by the ASIC 51.

Next, the detection method of the rotation direction of the PF motor 5 will be described. The rotation direction of the PF motor 5 is detected from the edge E1 of the output signal S1 and/or the edge E3 of the output signal S3, and the output level of the output signal S3 and/or the output signal S1 when the edge E1 and/or the edge E3 is detected. Alternatively, the rotation direction of the PF motor 5 is detected from the edge E11 of the first exclusive OR signal S11 and/or the edge E12 of the second exclusive OR signal S12, and the output level of the second exclusive OR signal S12 and/or the first exclusive OR signal S1 when the edge E11 and/or the edge E12 is detected. The view for the detection of the rotation direction of the PF motor 5 is the same as the first embodiment, and the specified description thereof will be omitted.

In this embodiment, like the detection of the rotation speed, when the PF motor 5 rotates at the rotation speed less than the predetermined rotation speed or equal to or less than the predetermined rotation speed, and the problems due to the high-frequency signals do not occur, a predetermined processing circuit (for example, the ASIC 51) that detects the rotation direction detects the rotation direction of the PF motor 5 using the high-frequency first and second exclusive OR signals S11 and S12. Further, when the PF motor 5 rotates at the rotation speed that is equal to or more than the predetermined rotation speed or exceeds the predetermined rotation speed, and the problems due to the high-frequency problems occur, the predetermined processing circuit that detects the rotation direction detects the rotation direction of the PF motor 5 using the low-frequency output signals S1 and S3.

In such a manner, in this embodiment, according to the rotation speed of the PF motor 5, the predetermined processing circuit that detects the rotation direction switches (selects) whether to detect the rotation position using the high-frequency first and second exclusive OR signals S11 and S12 or to detect the rotation position using the low-frequency output signals S1 and S3. Switching (selection) at the predetermined processing circuit is performed, for example, by an instruction from the CPU 39 on the basis of the information about the rotation speed of the PF motor 5.

Further, a predetermined control of the printer 1 is performed on the basis of the information about the rotation position of the PF motor 5 detected using the first and second exclusive OR signals S11 and S12 or the two output signals S1 and S3. For example, the rotation position of the PF motor 5 is detected on the basis of the information about the rotation direction, and the PID control of the printer 1 is performed on the basis of the detection result.

A method for determining the rotational speed of the PF motor 5 will next be described. The rotational speed of the PF motor 5 can be determined using the time (period) from the edge E at which the output signals S1 and S3 (or the first output exclusive OR signal S11 and the second output exclusive OR signal S12) rise (or fall) to the edge E at the next rising (or falling). For example, the rotational speed of the PF motor 5 can be determined using times T1, T3, T11, and T12 shown in FIGS. 17(E), 17(G), 17(I), and 17(J), respectively. Accordingly, the problems due to high-frequency signals, as described in the first embodiment, do not occur in determining the rotational speed.

Thus, in this embodiment, the rotational speed of the PF motor 5 is determined using the first output exclusive OR signal S11 and the second output exclusive OR signal S12 of high frequency irrespective of the rotational speed of the PF motor 5. Thus more rotational-speed information can be obtained from the first output exclusive OR signal S11 and the second output exclusive OR signal S12.

The printer 1 is controlled on the basis of the information on the rotational speed of the PF motor 5 determined using the first output exclusive OR signal S11 and the second output exclusive OR signal S12. The PID control of the PF motor 5 made on the basis of the information such as the rotational speed of the PF motor 5 determined by the ASIC 51.

As described above, in the second embodiment, since the structure of the rotary scale 34 is the same as the first embodiment, a plurality of slits 65 can be formed, without worrying the wastes or the strength. In addition, the rotary encoder 36 generates four output signals S1, S2, S3, and S4 from the level signals output from the light-receiving elements 69 arranged in four rows on one board 68, of which it outputs two output signal S1 and S2. In this embodiment, the rotary encoder 36 generates the first output exclusive OR signal S11 having double the frequency of the output signals S1 and S3 from the output signals S1 and S3 and outputs it, and generates the second output exclusive OR signal S12 having double the frequency of the output signals S2 and S4 from the output signals S2 and S4 and outputs it. The rotary encoder 36 can therefore obtain a resolution of position and speed eight times as high as with the slits 65 on the rotary scale 34 using the first output exclusive OR signal S11 and the second output exclusive OR signal S12.

As a result, the rotary scale 34 of the same size and accuracy as conventional ones can obtain a resolution of the position and speed eight times as high as the conventional ones. In other words, the rotary encoder 36 can output high-resolution output signals. Also a rotary scale 34 smaller than conventional ones can obtain a resolution of the position and speed equal to the conventional ones.

In the second embodiment, according to the rotation speed of the PF motor 5, the control of the printer 1 on the basis of the high-frequency first and second exclusive OR signals S11 and S12 or the control of the printer 1 on the basis of the low-frequency output signals S1 and S3 is switchably (selectably) performed. For this reason, when the problems due to the high-frequency signals do not occur even though the control is performed on the basis of the high-frequency first and second exclusive OR signals S11 and S12, a predetermined control of the printer 1 can be performed with higher resolution on the basis of the first exclusive OR signal S11 and the second exclusive OR signal S12. In addition, when the problems due to the high-frequency signals occur, the control of the printer 1 can be performed on the basis of the output signal S1 and the output signal S3, whose phases are sifted from each other by an eighth of the brightness cycle T. For this reason, the problems due to the high-frequency signals can be suppressed, and the configuration of a circuit that processes the output signals from the rotary encoder 36 can be simplified.

In the second embodiment, when the rotation speed of the PF motor 5 is equal to or more than the predetermined speed or exceeds the predetermined speed, the rotation position and the rotation direction of the PF motor 5 are detected from the high-frequency first and second exclusive OR signals S11 and S12, and the control is performed on the basis of the detection result. Further, when the rotation speed of the PF motor 5 is less than the predetermined speed or is equal to or less then the predetermined speed, the rotation position and the rotation direction of the PF motor 5 are detected from the low-frequency output signals S1 and S3, and the control is performed on the basis of the detection result.

In case of the PF motor 5, the positional accuracy of the PF motor 5 is demanded at the time of the stop, not at the time of the rotation. In this embodiment, before the PF motor 5 that rotates at the rotation speed less than the predetermined speed or equal to or less than the predetermined speed stops, the rotation position or the rotation direction of the PF motor 5 is detected from the high-frequency first and second exclusive OR signals S11 and S12, and the control of the PF motor 5 can be performed on the basis of the detection result. Therefore, the positional accuracy of the PF motor 5 at the time of the stop can be increased. Further, when the PF motor 5 rotates at the rotation speed that is equal to or more than the predetermined speed or exceeds the predetermined speed, the rotation position or the rotation direction of the PF motor 5 is detected from the low-frequency output signals S1 and S3, and the control of the PF motor 5 is performed on the basis of the detection result. Even in this case, there is no problem in view of the positional accuracy.

Other Embodiments

While preferred embodiments of the invention have been described, it is to be understood that the invention is not limited to those but various modifications and changes may be made without departing from the spirit and scope of the invention.

In the above-described embodiments, the rotary encoder 36 includes the rotary scale 34 having the transparent main body portion 34a formed of PET, the marks 34b attached to one surface of the main body portion 34a, and the through holes 34c formed in some of the slits 65. However, the main body portion 34a may be formed of transparent resin or a glass substrate, in addition to PET. Further, the marks 34b may be formed on both surfaces of the main body portion 34a, not one surface thereof. Further, the marks 34b are attached by deposition, such as sputtering or the like, or printing, but the marks 34b may be provided by plating or exposure using a resist. In addition, in case of using a method of printing the marks 34b, in addition to printing by an ink jet printer, other general printing methods can be used. Alternatively, the marks 34b may be buried in the main body portion 34a.

The through holes 34c may be provided at irregular intervals, not at regular intervals. For example, two through holes 34c may be successively provided, and then another two through holes 34c may be successively provided at an interval from the two through holes 34c. Further, the through holes 34c may be provided only in a predetermined angular range of the rotary scale 34, not in other angular ranges. In addition, in the above-described embodiments, each of the through holes 34c is a straight hole having the same width from the top to the bottom. However, each of the through holes 34c may be formed such that a side close to the mark 34b is wider and an opposing side is narrower or vice versa.

In addition, the rotary encoder 36 includes the disc-shaped rotary scale 34 and the sensor 35 that senses the light passing through the slits 65 formed along the outer periphery thereof. Alternatively, the rotary encoder 36 may be of a reflection type that detects light reflected by a plurality of marks formed along the outer periphery of the rotary scale 34.

The structure of the invention may be applied to the linear encoder 33 that determines the rotational speed and position of the CR motor 4. Specifically, the linear encoder 33 may be constructed such that a plurality of light-receiving elements is arranged on a board to which the light from light-emitting elements is reflected by the marks 31a, as in FIG. 12, and the level signals of the light-receiving elements are integrated together through the circuit shown in FIG. 13 or 16. This arrangement enables the linear encoder 33 to output a plurality of signals with a resolution higher than that of the marks 31a. The encoder may not necessarily be of an optical type but may be of magnetic or another type.

In the foregoing embodiments, the rotary encoder 36 outputs one output signal from the level signals of, e.g., the four ($=2^2$) light-receiving elements A1 (69) to A4 (69). Alternatively, the rotary encoder 36 may generate one output signal from the level signals of 2n+1 (n is an integer of 1 or above) sets of light-receiving elements 69, in which case the frequency of the output signal is 2n times that of the level signals of the light-receiving elements 69. In this case, for example, the light-receiving elements 69 in row A and the light-receiving elements 69 in row C may be disposed on the board 68 with a displacement of one 2n+2th of the light and shade cycle T, and the light-receiving elements 69 in row B and the light-receiving elements 69 in row D may be disposed on the board 68 with a displacement of one 2n+2th of the light and shade cycle T.

In the foregoing embodiments, the four light-receiving elements A1 (69) to A4 (69), B1 (69) to B4 (69), C1 (69) to C4 (69), and D1 (69) to D4 (69) are disposed next to each other in the range corresponding to the light and shade cycle T. However, they may not necessarily be disposed next to each other. For example, the first second light-receiving element A2 (69), the third light-receiving element A3 (69), and the fourth light-receiving element A4 (69) in row A may be disposed in a position in which a distance integer times of the light and shade cycle T is added to the first position shown in FIG. 11. The same arrangement is possible for rows B, C, and D. Furthermore, while rows A, B, C, and D are arranged with a displacement of one sixteenth of the light and shade cycle T with each other, they may be displaced at a pitch in which a distance integer times of the light and shade cycle T is added to one sixteenth of the light and shade cycle T.

While the foregoing embodiments use the four light-receiving elements A1 (69) to A4 (69), B1 (69) to B4 (69), C1 (69) to C4 (69), and D1 (69) to D4 (69) to generate the signals S, for example, the output signal S1 may be generated only with the first light-receiving element A1 (69). Specifically, the output signal S1 can be generated by generating a signal displaced from the signal detected by the first light-receiving element A1 (69) by one half, one quarter, and three quarters, and inputting them to the amplifiers 74, 75, 76, and 77. The signals S2, S3, and S4 can be generated similarly.

In the foregoing embodiments, the output-signal generating circuits 70, 71, 72, and 73 of four rows output signals that change at a duty of approximately 50%. Alternatively, the output-signal generating circuits 70, 71, 72, and 73 may output at a duty other than 50%, in which case the four light-receiving elements A1 (69) to A4 (69) may be disposed at intervals with a displacement other than one quarter of the light and shade cycle T, or at intervals in which a displacement integer times of the light and shade cycle T is added to the displacement.

In the first embodiment described above, according to the rotation speed of the PF motor 5, the control of the printer 1 on the basis of the two output signals or the control of the printer 1 on the basis of the four output signals is switchably performed. Further, in the second embodiment, according to the rotation speed of the PF motor 5, the control of the printer 1 on the basis of the high-frequency first exclusive OR circuit S11 and so on or the control of the printer 1 on the basis of the low-frequency output signal S1 and so on is switchably performed. Besides, according to the rotation position of the PF motor 5, it may be configured on the basis of which signals to switchably perform the control of the printer 1.

For example, as shown in FIG. 6, when the rotation position of the PF motor 5 is in a range of the target stop position X from a predetermined rotation position X1 before the PF motor 5 stops (that is, in a range of a predetermined range from the target stop position X) or when the rotation position of the PF motor 5 is out of the range, it may be configured on the basis of which signals to switchably perform the control of the printer 1.

More specifically, when the rotation position of the PF motor 5 is in the predetermined range from the target stop position X of the PF motor 5, the rotation position or the rotation direction of the PF motor 5 is detected from the four output signals S or from the high-frequency first and second exclusive OR signals S11 and S12, and the control of the printer 1 is performed on the basis of the detection result. Further, when the rotation position of the PF motor 5 is out of the predetermined range from the target stop position X of the PF motor 5, the rotation position or the rotation direction of the PF motor 5 is detected from the two output signals S, and the control of the printer 1 is performed on the basis of the detection result. With this configuration, the positional accuracy of the PF motor 5 at the time of the stop can be increased. Further, when the rotation position of the PF motor 5 is out of the predetermined range from the target stop position X of the PF motor 5, a processing at the control unit 37 is simplified.

In each of the embodiments described above, as for the detection of the rotation speed of the PF motor 5, all the four output signals S or the high-frequency first and second exclusive OR signals S11 and S12 are used, regardless of the rotation speed of the PF motor 5. Besides, according to the rotation speed of the PF motor 5, the signals to be used for the detection of the rotation speed of the PF motor 5 may be switched. For example, when the PF motor 5 rotates at a speed less than a predetermined rotation speed or equal to or less than the predetermined rotation speed, the rotation speed of the PF motor 5 is detected using the four output signals S. Meanwhile, when the PF motor 5 rotates at a speed that is equal to or more than the predetermined rotation speed or exceeds the predetermined rotation speed, the rotation speed of the PF motor 5 may be detected using the two signals of the output signals S1 and S3 or the two signals of the output signals S2 and S4. Further, when the PF motor 5 rotates at a speed less than the predetermined rotation speed or equal to or less than the predetermined rotation speed, the rotation speed of the PF motor 5 is detected using the high-frequency first and second exclusive OR signals S11 and S12. Meanwhile, when the PF motor 5 rotates at a speed that is equal to or more than the predetermined rotation speed or exceeds the predetermined rotation speed, the rotation speed of the PF motor 5 may be detected using the low-frequency output signals S1 and S3.

In the above-described embodiments, the configuration of the invention has been described by way of the printer 1. However, the encoder of the invention can be applied various fields, such as robots, machine tools, measurement, medical instruments, OA instruments, and so on. In addition, the arrangement of the invention can also be applied to multi-function printers, scanners, automatic document feeders (ADFs), copiers, facsimiles and so on.

What is claimed is:
1. An encoder comprising:
a light emitter, operable to emit light;
a light detector, operable to detect light; and
a scale, being located between the emitter and the detector, and comprising:
   a plurality of marks, formed at a predetermined interval; and
   a plurality of regions, each of which is formed between adjacent ones of the marks,
wherein at least one of the regions is formed with a through hole;
wherein not all of the regions are formed with a through hole;
wherein the marks are arranged on the scale in a circumferential direction; and wherein a width in the circumferential direction of the through hole is wider than the predetermined interval between the marks.

2. The encoder as set forth in claim 1, wherein a total number of the through holes is no more than one third of a total number of the regions.

3. The encoder as set forth in claim 1, wherein a total number of the through holes is no less than one tenth of a total number of the regions.

4. A printer operable to print information on a printing medium comprising:

a motor having a rotatable shaft;

the encoder as set forth in claim 1, wherein the scale is rotated in conjunction with the rotation of the shaft, and the light detector is operable to output a signal in accordance with the rotation of the scale;

a controller, which controls the rotation of the shaft based on the signal output from the detector.

5. The printer as set forth in claim 4, wherein the motor is operable to rotate a roller adapted to feed the printing medium.

* * * * *